United States Patent
Chen et al.

(10) Patent No.: US 10,661,171 B2
(45) Date of Patent: May 26, 2020

(54) INFORMATION PROCESSING METHOD, TERMINAL, AND COMPUTER STORAGE MEDIUM

(71) Applicant: Tencent Technology (Shenzhen) Company Limited, Shenzhen (CN)

(72) Inventors: Yu Chen, Shenzhen (CN); Yong Tang, Shenzhen (CN); Wei Gong, Shenzhen (CN); Jianmiao Weng, Shenzhen (CN)

(73) Assignee: Tencent Technology (Shenzhen) Company Limited, Shenzhen, Guangdong Province (CN)

( * ) Notice: Subject to any disclaimer, the term of this patent is extended or adjusted under 35 U.S.C. 154(b) by 271 days.

(21) Appl. No.: 15/725,146

(22) Filed: Oct. 4, 2017

(65) Prior Publication Data
US 2018/0028916 A1 Feb. 1, 2018

Related U.S. Application Data

(63) Continuation-in-part of application No. PCT/CN2016/081051, filed on May 4, 2016.

(30) Foreign Application Priority Data

Sep. 29, 2015 (CN) .......................... 2015 1 0633319

(51) Int. Cl.
*A63F 9/24* (2006.01)
*A63F 13/533* (2014.01)
(Continued)

(52) U.S. Cl.
CPC ........ *A63F 13/533* (2014.09); *A63F 13/2145* (2014.09); *A63F 13/33* (2014.09);
(Continued)

(58) Field of Classification Search
CPC ...... A63F 13/533; A63F 13/847; A63F 13/58; A63F 13/497; A63F 2300/308; A63F 13/335
See application file for complete search history.

(56) References Cited

U.S. PATENT DOCUMENTS

2005/0130738 A1   6/2005   Miyamoto et al.
2008/0120665 A1*  5/2008   Relyea ............... H04N 21/4147
                                              725/110
(Continued)

FOREIGN PATENT DOCUMENTS

CN      1743043 A       3/2006
CN    102356373 A       2/2012
(Continued)

OTHER PUBLICATIONS

Head-up display. dota2.gamepedia.com. Online. Mar. 25, 2015. Accessed via the Internet. Accessed Sep. 14, 2019. <URL: https://dota2.gamepedia.com/index.php?title=Head-up_display&oldid=789830> (Year: 2015).*

(Continued)

*Primary Examiner* — Dmitry Suhol
*Assistant Examiner* — Carl V Larsen
(74) *Attorney, Agent, or Firm* — Morgan, Lewis & Bockius LLP

(57) ABSTRACT

A method performed at a first gaming terminal of a plurality of gaming terminals engaged in a group game, wherein the first gaming terminal corresponds to a first game player, and a second gaming terminal corresponds to a second game player: displaying a first game scene from a first viewing perspective corresponding to the first game player; displaying, concurrently with the first game scene, a game avatar corresponding to the second game player; in response to detecting a user input that is directed to the game avatar corresponding to the second game player, and in accordance (Continued)

with a determination that the user input meets predefined team-view criteria: retrieving a second game scene from a second viewing perspective corresponding to the second game player; and displaying the second game scene at the first gaming terminal.

18 Claims, 10 Drawing Sheets

(51) Int. Cl.
| | |
|---|---|
| *G06F 9/44* | (2018.01) |
| *G06F 3/0484* | (2013.01) |
| *A63F 13/5372* | (2014.01) |
| *A63F 13/2145* | (2014.01) |
| *A63F 13/33* | (2014.01) |
| *A63F 13/497* | (2014.01) |
| *A63F 13/58* | (2014.01) |
| *A63F 13/847* | (2014.01) |
| *A63F 13/335* | (2014.01) |

(52) U.S. Cl.
CPC ........ *A63F 13/497* (2014.09); *A63F 13/5372* (2014.09); *A63F 13/58* (2014.09); *A63F 13/847* (2014.09); *G06F 3/0484* (2013.01); *G06F 9/44* (2013.01); *A63F 13/335* (2014.09); *A63F 2300/308* (2013.01); *A63F 2300/5533* (2013.01)

(56) References Cited

U.S. PATENT DOCUMENTS

| | | | |
|---|---|---|---|
| 2010/0281438 A1 | 11/2010 | Latta et al. | |
| 2011/0244961 A1* | 10/2011 | Soelberg | G06F 3/017 463/32 |
| 2013/0316813 A1 | 11/2013 | Derome et al. | |
| 2014/0113718 A1* | 4/2014 | Norman | A63F 13/12 463/31 |
| 2014/0152758 A1 | 6/2014 | Tong et al. | |
| 2018/0288354 A1* | 10/2018 | Anderson | G06T 11/60 |

FOREIGN PATENT DOCUMENTS

| | | |
|---|---|---|
| CN | 102414641 A | 4/2012 |
| CN | 103107982 A | 5/2013 |
| CN | 103365596 A | 10/2013 |
| CN | 104168969 A | 11/2014 |
| CN | 105159687 A | 12/2015 |
| JP | 2009240659 A | 10/2009 |
| JP | 2012521039 A | 9/2012 |
| JP | 2015057106 A | 3/2015 |
| WO | WO 2015/133032 A1 | 9/2015 |

OTHER PUBLICATIONS

File:Interface00gen.jpg, Online. Nov. 16, 2013. Accessed via the Internet. Accessed Sep. 14, 2019. <URL: https://dota2.gamepedia.com/File:Interface00gen.jpg> (Year: 2013).*

Dota 2. store.steampowered.com. Online. Accessed via the Internet. Accessed Sep. 14, 2019. <URL: https://store.steampowered.com/app/570/Dota_2/> (Year: 2019).*

Dota 2. Wikipedia.org. Online. Mar. 18, 2015. Accessed via the Internet. Accessed Sep. 14, 2019. <URL: https://en.wikipedia.org/w/index.php?title=Dota_2&oldid=651955698> (Year: 2015).*

Steam Screenshots Feature Now Available. store.steampowered.com. Online Feb. 24, 2011. Accessed via the Internet. Accessed Sep. 14, 2019. <URL: https://store.steampowered.com/news/5047/> (Year: 2011).*

LS. [Tips] Why you should use F-keys to improve your gameplay. Youtube.com. Online. Jun. 11, 2015. Accessed via the Internet. Accessed Sep. 14, 2019. <URL: https://www.youtube.com/watch?v=y7rpn1_HLCg> (Year: 2015).*

Tencent Technology, Written Opinion, PCT/CN2016/081051, dated Jul. 26, 2016, 7 pgs.

Tencent Technology, IPRP, PCT/CN2016/081051, Apr. 3, 2018, 8 pgs.

Tencent Technology, ISR, PCT/CN2016/081051, Jul. 26, 2016, 2 pgs.

* cited by examiner

INFORMATION PROCESSING METHOD, TERMINAL, AND COMPUTER STORAGE MEDIUM

PRIORITY CLAIM AND RELATED APPLICATIONS

This application is a continuation-in-part application of PCT/CN2016/081051, entitled "INFORMATION PROCESSING METHOD AND TERMINAL, AND COMPUTER STORAGE MEDIUM" filed on May 4, 2016, which claims priority to Chinese Patent Application No. 201510633319.2, filed with the State Intellectual Property Office of the People's Republic of China on Sep. 29, 2015, and entitled "INFORMATION PROCESSING METHOD AND TERMINAL, AND COMPUTER STORAGE MEDIUM", both of which are incorporated herein by reference in their entirety.

FIELD OF THE TECHNOLOGY

The present disclosure relates to information processing technologies, and in particular, to an information processing method, a terminal, and a computer storage medium.

BACKGROUND OF THE DISCLOSURE

With rapid development of Internet technologies and gradual popularization of large-screen and super-screen intelligent terminals, a processor of an intelligent terminal has an increasingly high processing capability, so that many applications that implement control based on man-machine interaction appear on a large screen or a super screen. In a process of implementing control based on man-machine interaction, multiple users may run different interaction modes by creating groups in one-to-one, one-to-many, and many-to-many forms, to obtain different interaction results. For example, in a graphical user interface (GUI) obtained through rendering on a large screen or a super screen, after multiple users are grouped into two different groups, by means of control processing in man-machine interaction, information exchange may be performed between the different groups, and different interaction results are obtained according to a response to information exchange; and by means of control processing in man-machine interaction, information exchange may further be performed between group members in a same group, and different interaction results are obtained according to a response to information exchange.

SUMMARY

In the existing technology, in a GUI obtained through rendering on a large screen or a super screen, usually, only a part of a virtual area in which a virtual character controlled by a user is displayed. Consequently, during control by the user, in the GUI, a target object controlled by a group member that belongs to a same group or team as the user may be not included. In this case, if the user wants to obtain a vision of the group member, the user needs to perform multiple times of operations (such as a slide operation) to make a character move, until the character moves near the target object, so as to obtain, in the current GUI, an image presented in a GUI controlled by the group member, that is, obtain the vision of the group member. A control time of the process is relatively long, and a requirement of performing information exchange rapidly cannot be met. In related technologies, there is still no effective solution to the problem currently.

Embodiments of the present technology provide an information processing method, a terminal, and a computer storage medium, so as to rapidly obtain a vision image of a group member (e.g., a game scene as viewed by the group member at the group member's terminal, or a game scene that includes a game character controlled by the group member) in an information exchange process, thereby improving user experience.

To achieve the foregoing objective, the technical solutions in the embodiments of the present technology are implemented as follows:

An embodiment of the present technology provides an information processing method, a software application being executed on a processor of a terminal and rendering being performed on a display of the terminal, to obtain a GUI, the processor, the GUI, and the software application being implemented in a game system, and the method including:

performing rendering in the GUI, to obtain at least one virtual resource object;

deploying in such a manner that at least one character container object in at least one character selection area in the GUI includes at least one window location; and performing, when detecting a vision obtaining gesture on at least one character operation object in the character container object, rendering in the GUI, to obtain a vision image captured by a virtual lens associated with the at least one character operation object.

An embodiment of the present technology further provides a terminal, the terminal including: a rendering processing unit, a deployment unit, a detection unit, and an operation execution unit, the rendering processing unit being configured to: execute a software application and perform rendering, to obtain a GUI; and perform rendering in the GUI, to obtain at least one virtual resource object; and being further configured to: perform rendering in the GUI, to obtain a vision image captured by a virtual lens associated with at least one character operation object that is obtained by the operation execution unit;

the deployment unit being configured to: deploy in such a manner that at least one character container object in at least one character selection area in the GUI includes at least one window location;

the detection unit being configured to detect a vision obtaining gesture on the at least one character operation object in the character container object; and the operation execution unit being configured to obtain, when the detection unit detects the vision obtaining gesture on the at least one character operation object in the character container object, the vision image captured by the virtual lens associated with the at least one character operation object.

An embodiment of the present technology further provides a terminal, the terminal including: a processor and a display; the processor being configured to: execute a software application and perform rendering on the display, to obtain a GUI; and the processor, the GUI, and the software application being implemented on a game system; and the processor being configured to: perform rendering in the GUI, to obtain at least one virtual resource object; and deploy in such a manner that at least one character container object in at least one character selection area in the GUI includes at least one window location; and perform, when detecting a vision obtaining gesture on at least one character operation object in the character container object, rendering in the GUI, to obtain a vision image captured by a virtual lens associated with the at least one character operation object.

An embodiment of the present technology further provides a computer storage medium, a computer executable instruction being stored in the computer storage medium, and the computer executable instruction being configured to perform the information processing method in the embodiments of the present technology.

According to the information processing method, the terminal, and the computer storage medium in the embodiments of the present technology, by means of a window location in a character container object deployed in a character selection area in a GUI, rendering is performed, in a corresponding window location, on a character operation object associated with a second character object that belongs to a same group as a user character object, so that a user can rapidly obtain a vision image of the corresponding second character object by means of a vision obtaining gesture on the character operation object, thereby greatly improving operation experience of the user in an interaction process.

DESCRIPTION OF EMBODIMENTS

The present disclosure is further described in detail below with reference to the accompanying drawings and specific embodiments.

Figure 1:
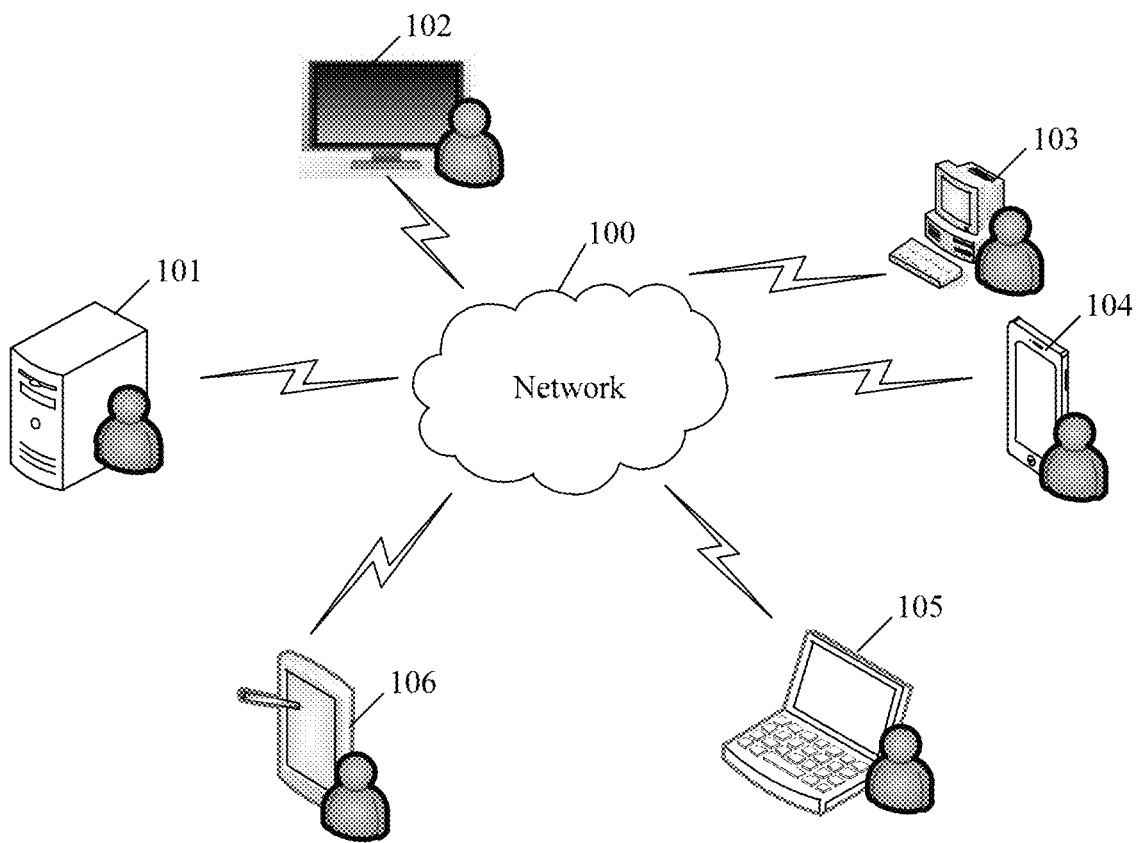
FIG. 1 is a schematic diagram of an application architecture of information exchange in an information processing method according to some embodiments of the present technology.

FIG. 1 is a schematic diagram of an application architecture of information exchange in an information processing method according to an embodiment of the present technology. As shown in FIG. 1, the application architecture includes: a server 101 (e.g., game server of an online multiplayer game) and at least one terminal (e.g., gaming terminals controlled by players). As shown in the application architecture, the terminal includes: a terminal 102, a terminal 103, a terminal 104, a terminal 105, and a terminal 106. The at least one terminal may establish a connection to the server 101 by using a network 100 (such as a wired network or a wireless network). Specifically, the terminal includes a mobile phone, a desktop computer, a PC, an all-in-one PC, and other types.

In this embodiment, a processor of the terminal can execute a software application and perform rendering on a display of the terminal, to obtain a GUI (e.g., a game user interface, including display of a game scene (e.g., representing a viewing perspective of a respective game player, such as a first person view or a bird's eye view, or a "God's view" from above, etc.), and various game control affordances, status indicators, etc.). The processor, the GUI, and the software application are implemented on a game system. In this embodiment, in a process of implementing the processor, the GUI, and the software application in the game system, the at least one terminal may perform information exchange with the server 101 by using a wired network or a wireless network, to implement a one-to-one or many-to-many (such as three-to-three or five-to-five) application mode scenario in the game system. In the one-to-one application scenario, a virtual resource object (e.g., a game character) in a graphical user object (e.g., a game window showing the game scene) obtained through rendering by a terminal may perform information exchange with a virtual resource object (e.g., another game character) preset in the game system (which may be understood as man vs machine), that is, the terminal performs information exchange with the server. Alternatively, in the one-to-one application scenario, a virtual resource object in a graphical user object obtained through rendering by a terminal may perform information exchange with a virtual resource object in a graphical user object obtained through rendering by another terminal, for example, a virtual resource object in a graphical user object obtained through rendering by the terminal 102 performs information exchange with a virtual resource object in a graphical user object obtained through rendering by the terminal 103. In the many-to-many application mode scenario, using the three-to-three application mode scenario as an example, virtual resource objects (e.g., game characters controlled respectively by different users or game players) in graphical user objects (e.g., game windows displayed at different gaming terminals of the different users) that are obtained through rendering respectively performed by a terminal 1, a terminal 2, and a terminal 3 (e.g., the different gaming terminals controlled by the different users) are grouped into a first group (e.g., a game team on the same side of the battle), virtual resource objects (e.g., game characters corresponding to different game players at the different gaming terminals) in graphical user objects (e.g., game windows showing game scenes from different viewing perspectives of the corresponding game players) that are obtained through rendering respectively performed by a terminal 4, a terminal 5, and a terminal 6 are grouped into a second group (e.g., an opposing game team of the first group), and a group member in the first group performs information exchange with a group member in the second group. In some embodiments, the information exchange (e.g., exchange of viewing perspective of the game space as rendered on the different players' terminals) occur between team members of the same group. In some embodiments, the information exchange occur between members of different game teams.

The example in FIG. 1 is only an example of an application architecture for implementing the embodiments of the present technology, and the embodiments of the present technology are not limited to the application architecture in FIG. 1. Based on the application architecture, various embodiments of the present technology are provided.

Figure 2:
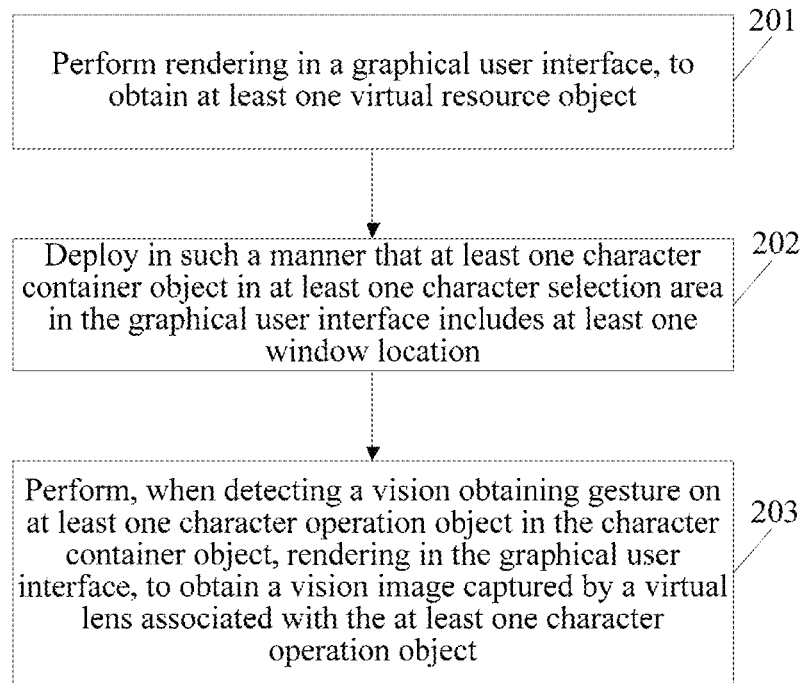
FIG. 2 is a schematic flowchart of an information processing method according to some embodiments of the present technology.

FIG. 2 is a schematic flowchart of the information processing method according to some embodiments of the present technology. The information processing method is applied to a terminal. A software application is executed on a processor of the terminal and rendering is performed on a display of the terminal, to obtain a GUI (e.g., a game window or a view of a game scene). The processor, the GUI, and the software application are implemented in a game system. As shown in FIG. 2, the method includes the following operations:

Operation 201: Perform rendering in the GUI, to obtain at least one virtual resource object (e.g., a game character controlled by the game player at the current terminal). At least one of the virtual resource object is configured as a user character object (e.g., a game character) that performs a first virtual operation (e.g., a game action) according to an input first user command (e.g., a user interface operation performed by the user operating at the terminal, such as a button press, a gesture, that is used to trigger a game action on the part of the game character controlled by the user, etc.). For example, the GUI includes a game window that shows at least a portion of the game world that includes the game character controlled by the user, and possibly other game characters or objects that are in the vicinity of the game character controlled by the user. In some embodiments, as conventionally done, the user may pan the game window to see other portions of the game world, such as portions that include the game characters controlled by other team members of the user.

Operation 202: Deploy in such a manner that at least one character container object (e.g., a pop-up window or floating window, or a call-out bubble, etc.) in at least one character selection area (e.g., an area of the game interface that shows a listing of the avatars that corresponds to the team members of the user) in the GUI includes at least one window location (e.g., a location that is at an upper corner of the game UI, overlaid on the game scene normally shown to the user, or next to the game scene normally shown to the user).

Operation 203: Perform, when detecting a vision obtaining gesture (e.g., a user input that triggers the operation to display the game scene from the viewing perspective of another player) on at least one character operation object (e.g., an avatar of a team member) in the character container object (e.g., the area showing the listing of avatars of the team members), rendering in the GUI, to obtain a vision image captured by a virtual lens associated with the at least one character operation object (e.g., a game scene from the viewing perspective of another game player on the team of the user).

In this embodiment, the GUI includes the at least one character selection area, the character selection area includes the at least one character container object (e.g., avatar of a game player), and the character container object includes the at least one window location (e.g., a location on the game UI to show the game scene from the viewing perspective of the selected game player). Corresponding character operation objects are carried in at least some window locations. The character operation object may be represented by using an identifier (the identifier may be an avatar) of a character object associated with the character operation object in the GUI. Herein, the character object associated with the character operation object belongs to a same group as a user character object. A manner of rendering on the character container object in the character selection area includes, but is not limited to: a bar shape or an annular shape, that is, the character container object may be represented by using a character selection bar object or a character selection wheel object.

Figure 3:
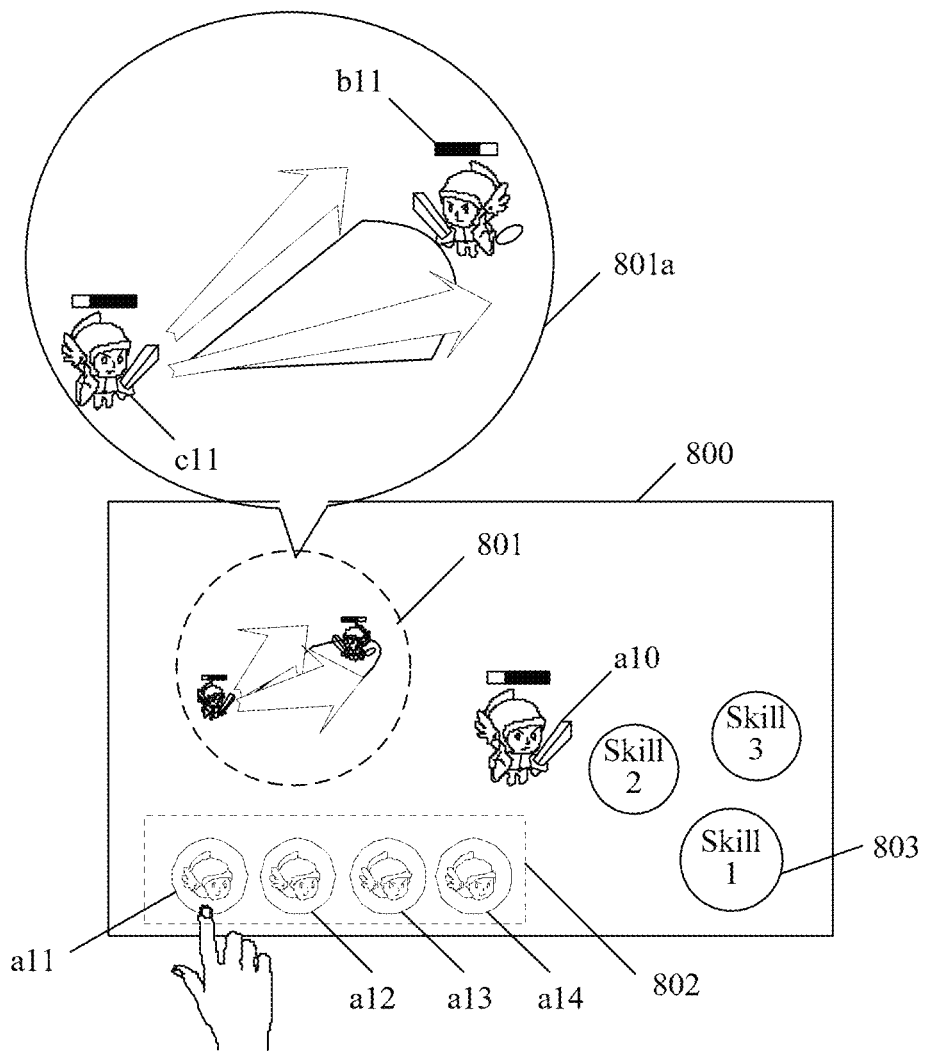
FIG. 3 is a first schematic diagram of a GUI in an information processing method according to some embodiments of the present technology.

FIG. 3 is a first schematic diagram of the GUI in the information processing method according to this embodiment of the present technology. As shown in FIG. 3, a GUI 800 obtained through rendering on the display of the terminal includes the at least one virtual resource object. The virtual resource object includes at least one user character object a10. A user of the terminal may perform information exchange by using the GUI, that is, input a user command. The user character object a10 can perform a first virtual operation based on a first user command detected by the terminal, where the first virtual operation includes, but is not limited to: a moving operation, a physical attack operation, a skill attack operation, and the like. It may be understood that, the user character object a10 is a character object controlled by the user of the terminal. In the game system, the user character object a10 can perform a corresponding action in the GUI based on an operation of the user. In an implementation, the GUI 800 further includes at least one skill object 803, and the user may control, by means of a skill release operation, the user character object a10 to perform a corresponding skill release operation.

In the example shown in FIG. 3, the GUI includes a character selection area 802, and a character container object is deployed in the character selection area 802. In this example, the character container object is represented by using a character selection bar object (that is, the character container object presents a display effect of a bar shape). The character container object includes at least one window location, and rendering is performed, in a corresponding window location, on a character operation object associated with a second character object that belongs to a same group as the user character object. An example in which the character operation object is represented by using an avatar is used, that is, the character selection area 802 includes at least one avatar. The at least one avatar is respectively in a one-to-one correspondence with at least one second character object that belongs to the same group as the user character object. As shown in FIG. 3, a five-to-five application scenario is used in this example. There are four character objects that belong to a same group as the user character object a10, and correspondingly, there are four character operation objects in the character selection area 802, for example, a character operation object a11, a character operation object a12, a character operation object a13, and a character operation object a14 shown in FIG. 3. It may be understood that, the four character operation objects in the character selection area 802 are in a one-to-one correspondence with four second character objects that belong to the same group as the user character object. This embodiment may be applied to an application scenario of a battle of multiple persons including at least two group members.

In an implementation, a mutual location relationship between at least two character operation objects in the character selection area 802 is determined according to a time order of entering the game system by the at least two character operation objects. As shown in FIG. 3, a time that a character object associated with the character operation object a11 enters the game system is earlier than a time that a character object associated with the character operation object a12 enters the game system, a time that a character object associated with the character operation object a13 enters the game system, and a time that a character object associated with the character operation object a14 enters the game system, and so on, and details are not described herein.

In this embodiment, when the vision obtaining gesture on the at least one character operation object in the character container object is detected, rendering is performed in the GUI, to obtain the vision image captured by the virtual lens associated with the at least one character operation object, where the vision obtaining gesture may be a long press operation gesture, a double tap operation gesture, and the like, and is not limited to the foregoing operation gestures.

Herein, when detecting the vision obtaining gesture on the at least one character operation object in the character container object, the method further includes: generating and sending a first instruction, where the first instruction is configured to invoke the virtual lens associated with the at least one character operation object and control the virtual lens to capture the vision image; and obtaining, in a process of detecting the vision obtaining gesture, the vision image captured by the virtual lens.

Specifically, referring to FIG. 3, an example in which the vision obtaining gesture is a long press gesture is used. When a long press gesture on a character operation object (such as the character operation object a11 shown in FIG. 3) in the character selection area 802 is detected, the terminal generates a first instruction, establishes, based on the first instruction, a network connection to an another terminal corresponding to a character object associated with the character operation object, and sends, based on the network connection, the first instruction to the another terminal corresponding to the character object associated with the character operation object, to control the another terminal to invoke, based on the first instruction, a virtual lens of the another terminal, and capture a vision image by using the virtual lens. In a process of continuously detecting the long press gesture on the character operation object a11, the terminal obtains, in real time, the vision image sent by the another terminal, and performs rendering in the GUI, to obtain the vision image. As shown in a vision image display area 801 and an enlarged view 801a of the vision image display area 801 shown in FIG. 3, a vision image corresponding to the character operation object a11 is displayed in the vision image display area 801; and the vision image is an image that can be viewed by a user controlling the character object associated with the character operation object a11. For example, if the character object c11 associated with the character operation object a11 currently performs a release operation on a skill object towards another character object b11, a vision image in which the character object c11 associated with the character operation object a11 currently performs the release operation on the skill object towards the another character object b11 is displayed in the vision image display area 801 in the GUI 800, as shown in FIG. 3. It may be understood that, by means of the vision obtaining gesture (such as the long press gesture), the terminal can rapidly switch to a vision image of another corresponding terminal, so that the user of the terminal can rapidly obtain a vision image of a teammate.

By means of the technical solution in this embodiment of the present technology, by means of a window location in a character container object deployed in a character selection area in a GUI, rendering is performed, in a corresponding window location, on a character operation object associated with a second character object that belongs to a same group as a user character object, so that a user can rapidly obtain a vision image of the corresponding second character object by means of a vision obtaining gesture on the character operation object, thereby greatly improving operation experience of the user in an interaction process.

Figure 4:
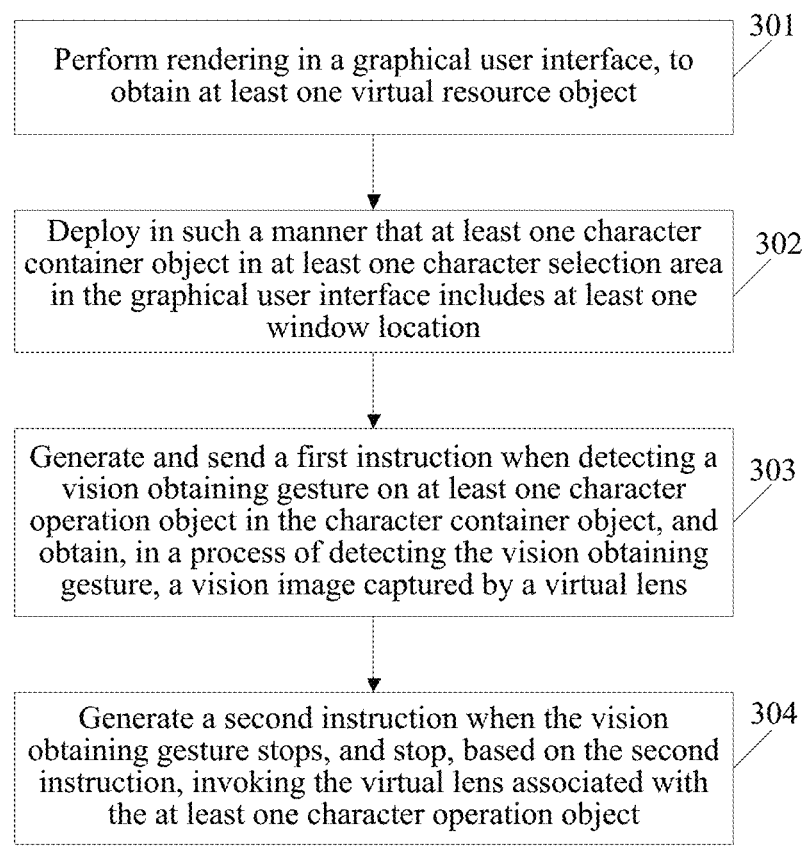
FIG. 4 is a schematic flowchart of an information processing method according to some embodiments of the present technology.

FIG. 4 is a schematic flowchart of the information processing method according to some embodiments of the present technology. The information processing method is applied to a terminal. A software application is executed on a processor of the terminal and rendering is performed on a display of the terminal, to obtain a GUI. The processor, the GUI, and the software application are implemented in a game system. As shown in FIG. 4, Operation 301: Perform rendering in the GUI, to obtain at least one virtual resource object.

Operation 302: Deploy in such a manner that at least one character container object in at least one character selection area in the GUI includes at least one window location.

In this embodiment, the GUI includes the at least one character selection area, the character selection area includes the at least one character container object, and the character container object includes the at least one window location. Corresponding character operation objects are carried in at least some window locations. The character operation object may be represented by using an identifier (the identifier may be an avatar) of a character object associated with the character operation object in the GUI. Herein, the character object associated with the character operation object belongs to a same group as a user character object. A manner of rendering on the character container object in the character selection area includes, but is not limited to: a bar shape or an annular shape, that is, the character container object may be represented by using a character selection bar object or a character selection wheel object.

Specifically, referring to FIG. 3, a GUI 800 obtained through rendering on the display of the terminal includes the at least one virtual resource object. The virtual resource object includes at least one user character object a10. A user of the terminal may perform information exchange by using the GUI, that is, input a user command. The user character object a10 can perform a first virtual operation based on a first user command detected by the terminal, where the first virtual operation includes, but is not limited to: a moving operation, a physical attack operation, a skill attack operation, and the like. It may be understood that, the user character object a10 is a character object controlled by the user of the terminal. In the game system, the user character object a10 can perform a corresponding action in the GUI based on an operation of the user. In an implementation, the GUI 800 further includes at least one skill object 803, and the user may control, by means of a skill release operation, the user character object a10 to perform a corresponding skill release operation.

In the example shown in FIG. 3, the GUI includes a character selection area 802, and a character container object is deployed in the character selection area 802. In this example, the character container object is represented by using a character selection bar object (that is, the character container object presents a display effect of a bar shape). The character container object includes at least one window location, and rendering is performed, in a corresponding window location, on a character operation object associated with a second character object that belongs to a same group as the user character object. An example in which the character operation object is represented by using an avatar is used, that is, the character selection area 802 includes at least one avatar. The at least one avatar is respectively in a one-to-one correspondence with at least one second character object that belongs to the same group as the user character object. As shown in FIG. 3, a five-to-five application scenario is used in this example. There are four character objects that belong to a same group as the user character object a10, and correspondingly, there are four character operation objects in the character selection area 802, for example, a character operation object a11, a character operation object a12, a character operation object a13, and a character operation object a14 shown in FIG. 3. It may be understood that, the four character operation objects in the character selection area 802 are in a one-to-one correspondence with four second character objects that belong to the same group as the user character object. This embodiment may be applied to an application scenario of a battle of multiple persons including at least two group members.

In an implementation, a mutual location relationship between at least two character operation objects in the character selection area 802 is determined according to a time order of entering the game system by the at least two character operation objects. As shown in FIG. 3, a time that a character object associated with the character operation object a11 enters the game system is earlier than a time of a character object associated with the character operation object a12, a time of the character operation object a13, and a time of the character operation object a14, and so on, and details are not described herein.

Operation 303: Generate and send a first instruction when detecting a vision obtaining gesture on at least one character operation object in the character container object, and obtain, in a process of detecting the vision obtaining gesture, a vision image captured by a virtual lens, where the first instruction is configured to invoke a virtual lens associated with the at least one character operation object and control the virtual lens to capture a vision image; and perform rendering in the GUI, to obtain the vision image captured by the virtual lens associated with the at least one character operation object.

Specifically, referring to FIG. 3, an example in which the vision obtaining gesture is a long press gesture is used. When a long press gesture on a character operation object (such as the character operation object a11 shown in FIG. 3) in the character selection area 802 is detected, the terminal generates a first instruction, establishes, based on the first instruction, a network connection to an another terminal corresponding to a character object associated with the character operation object, and sends, based on the network connection, the first instruction to the another terminal corresponding to the character object associated with the character operation object, to control the another terminal to invoke, based on the first instruction, a virtual lens of the another terminal, and capture a vision image by using the virtual lens. In a process of continuously detecting the long press gesture on the character operation object a11, the terminal obtains, in real time, the vision image sent by the another terminal, and performs rendering in the GUI, to obtain the vision image. As shown in a vision image display area 801 and an enlarged view 801*a* of the vision image display area 801 shown in FIG. 3, a vision image corresponding to the character operation object a11 is displayed in the vision image display area 801; and the vision image is an image that can be viewed by a user controlling the character object associated with the character operation object a11. For example, if the character object c11 associated with the character operation object a11 currently performs a release operation on a skill object towards another character object b11, a vision image in which the character object c11 associated with the character operation object a11 currently performs the release operation on the skill object towards the another character object b11 is displayed in the vision image display area 801 in the GUI 800, as shown in FIG. 3. It may be understood that, by means of the vision obtaining gesture (such as the long press gesture), the terminal can rapidly switch to a vision image of another corresponding terminal, so that the user of the terminal can rapidly obtain a vision image of a teammate.

Operation 304: Generate a second instruction when the vision obtaining gesture stops, and stop, based on the second instruction, invoking the virtual lens associated with the at least one character operation object.

Specifically, an example in which the vision obtaining gesture is the long press gesture is used. The second instruction is generated when the long press gesture stops, and invoking the virtual lens associated with the at least one character operation object is stopped based on the second instruction; and the network connection between the terminal and the another terminal is terminated.

By means of the technical solution in this embodiment of the present technology, by means of a window location in a character container object deployed in a character selection area in a GUI, rendering is performed, in a corresponding window location, on a character operation object associated with a second character object that belongs to a same group as a user character object, so that a user can rapidly obtain a vision image of the corresponding second character object by means of a vision obtaining gesture on the character operation object, thereby greatly improving operation experience of the user in an interaction process.

Figure 5:
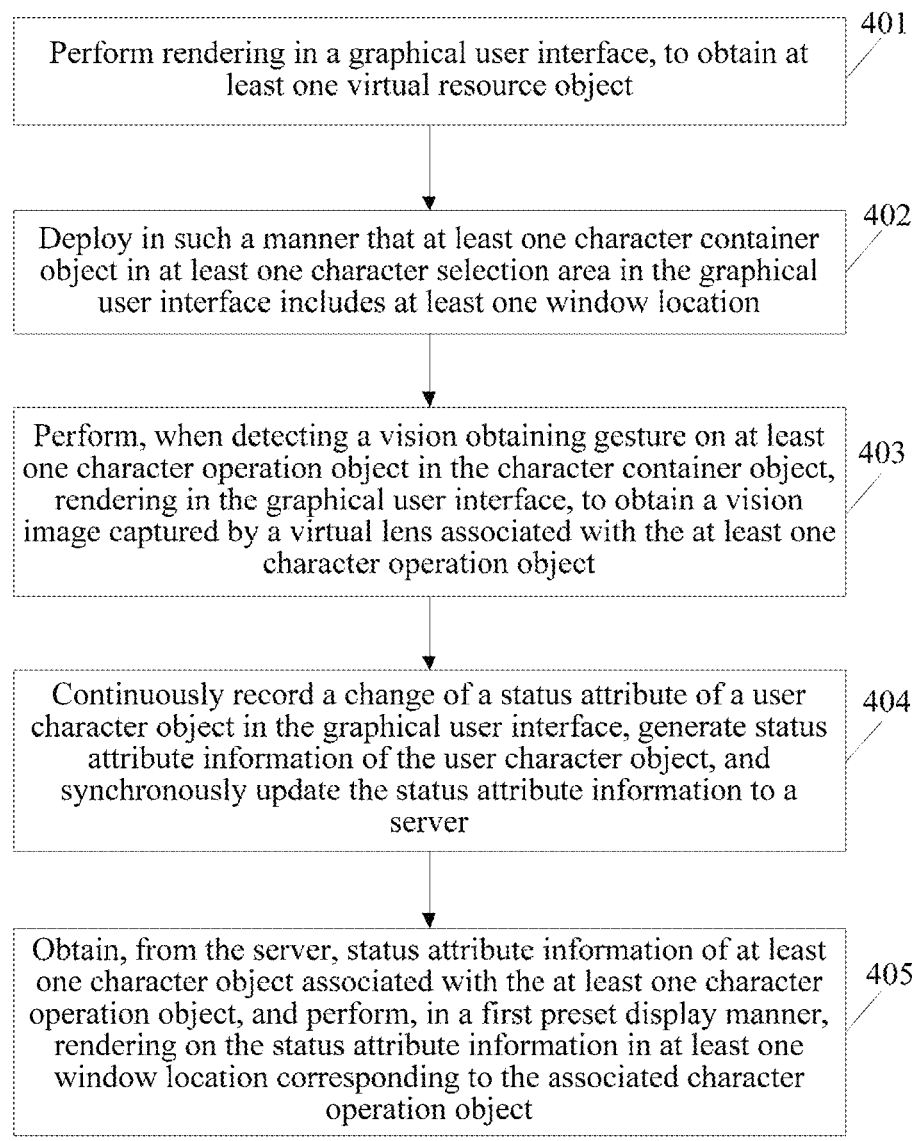
FIG. 5 is a schematic flowchart of an information processing method according to some embodiments of the present technology.

FIG. 5 is a schematic flowchart of the information processing method according to some embodiments of the present technology. The information processing method is applied to a terminal. A software application is executed on a processor of the terminal and rendering is performed on a display of the terminal, to obtain a GUI. The processor, the GUI, and the software application are implemented in a game system. As shown in FIG. 5, Operation 401: Perform rendering in the GUI, to obtain at least one virtual resource object.

Operation 402: Deploy in such a manner that at least one character container object in at least one character selection area in the GUI includes at least one window location.

In this embodiment, the GUI includes the at least one character selection area, the character selection area includes the at least one character container object, and the character container object includes the at least one window location. Corresponding character operation objects are carried in at least some window locations. The character operation object may be represented by using an identifier (the identifier may be an avatar) of a character object associated with the character operation object in the GUI. Herein, the character object associated with the character operation object belongs to a same group as a user character object. A manner of rendering on the character container object in the character selection area includes, but is not limited to: a bar shape or an annular shape, that is, the character container object may be represented by using a character selection bar object or a character selection wheel object.

Specifically, referring to FIG. 3, a GUI 800 obtained through rendering on the display of the terminal includes the at least one virtual resource object. The virtual resource object includes at least one user character object a10. A user of the terminal may perform information exchange by using the GUI, that is, input a user command. The user character object a10 can perform a first virtual operation based on a first user command detected by the terminal, where the first virtual operation includes, but is not limited to: a moving operation, a physical attack operation, a skill attack operation, and the like. It may be understood that, the user character object a10 is a character object controlled by the user of the terminal. In the game system, the user character object a10 can perform a corresponding action in the GUI based on an operation of the user. In an implementation, the GUI 800 further includes at least one skill object 803, and the user may control, by means of a skill release operation, the user character object a10 to perform a corresponding skill release operation.

In the example shown in FIG. 3, the GUI includes a character selection area 802, and a character container object is deployed in the character selection area 802. In this example, the character container object is represented by using a character selection bar object (that is, the character container object presents a display effect of a bar shape). The character container object includes at least one window location, and rendering is performed, in a corresponding window location, on a character operation object associated with a second character object that belongs to a same group as the user character object. An example in which the character operation object is represented by using an avatar is used, that is, the character selection area 802 includes at least one avatar. The at least one avatar is respectively in a one-to-one correspondence with at least one second character object that belongs to the same group as the user character object. As shown in FIG. 3, a five-to-five application scenario is used in this example. There are four character objects that belong to a same group as the user character object a10, and correspondingly, there are four character operation objects in the character selection area 802, for example, a character operation object a11, a character operation object a12, a character operation object a13, and a character operation object a14 shown in FIG. 3. It may be understood that, the four character operation objects in the character selection area 802 are in a one-to-one correspondence with four second character objects that belong to the same group as the user character object. This embodiment may be applied to an application scenario of a battle of multiple persons including at least two group members.

In an implementation, a mutual location relationship between at least two character operation objects in the character selection area 802 is determined according to a time order of entering the game system by the at least two character operation objects. As shown in FIG. 3, a time that a character object associated with the character operation object a11 enters the game system is earlier than a time of a character object associated with the character operation object a12, a time of the character operation object a13, and a time of the character operation object a14, and so on, and details are not described herein.

Operation 403: Perform, when detecting a vision obtaining gesture on at least one character operation object in the character container object, rendering in the GUI, to obtain a vision image captured by a virtual lens associated with the at least one character operation object.

Herein, when detecting the vision obtaining gesture on the at least one character operation object in the character container object, the method further includes: generating and sending a first instruction, where the first instruction is configured to invoke the virtual lens associated with the at least one character operation object and control the virtual lens to capture the vision image; and obtaining, in a process of detecting the vision obtaining gesture, the vision image captured by the virtual lens.

Specifically, referring to FIG. 3, an example in which the vision obtaining gesture is a long press gesture is used. When a long press gesture on a character operation object (such as the character operation object a11 shown in FIG. 3) in the character selection area 802 is detected, the terminal generates a first instruction, establishes, based on the first instruction, a network connection to an another terminal corresponding to a character object associated with the character operation object, and sends, based on the network connection, the first instruction to the another terminal corresponding to the character object associated with the character operation object, to control the another terminal to invoke, based on the first instruction, a virtual lens of the another terminal, and capture a vision image by using the virtual lens. In a process of continuously detecting the long press gesture on the character operation object a11, the terminal obtains, in real time, the vision image sent by the another terminal, and performs rendering in the GUI, to obtain the vision image. As shown in a vision image display area 801 and an enlarged view 801a of the vision image display area 801 shown in FIG. 3, a vision image corresponding to the character operation object a11 is displayed in the vision image display area 801; and the vision image is an image that can be viewed by a user controlling the character object associated with the character operation object a11. For example, if the character object c11 associated with the character operation object a11 currently performs a release operation on a skill object towards another character object b11, a vision image in which the character object c11 associated with the character operation object a11 currently performs the release operation on the skill object towards the another character object b11 is displayed in the vision image display area 801 in the GUI 800, as shown in FIG. 3. It may be understood that, by means of the vision obtaining gesture (such as the long press gesture), the terminal can rapidly switch to a vision image of another corresponding terminal, so that the user of the terminal can rapidly obtain a vision image of a teammate.

In an implementation, a second instruction is generated when the vision obtaining gesture stops, and invoking the virtual lens associated with the at least one character operation object is stopped based on the second instruction.

Specifically, an example in which the vision obtaining gesture is the long press gesture is used. The second instruction is generated when the long press gesture stops, and invoking the virtual lens associated with the at least one character operation object is stopped based on the second instruction; and the network connection between the terminal and the another terminal is terminated.

Operation 404: Continuously record a change of a status attribute of a user character object in the GUI, generate status attribute information of the user character object, and synchronously update the status attribute information to a server.

Operation 405: Obtain, from the server, status attribute information of at least one character object associated with the at least one character operation object, and perform, in a first preset display manner, rendering on the status attribute information in at least one window location corresponding to the associated character operation object.

In this embodiment, when the terminal continuously records the change of the status attribute of the user character object in the GUI, that is, in a process in which the user character object performs information exchange with another character object, the terminal records the change of the status attribute of the user character object in real time, to obtain the status attribute information of the user character object, where the status attribute information includes, but is not limited to: a blood value, a hit point, or the skill attribute information of the user character object. The terminal synchronizes the obtained the status attribute information of the user character object to the server in real time. Correspondingly, for the at least one second character object that belongs to the same group as the user character object, a terminal corresponding to the second character object also obtains status attribute information of the second character object in real time and synchronizes the status attribute information to the server.

Figure 6:
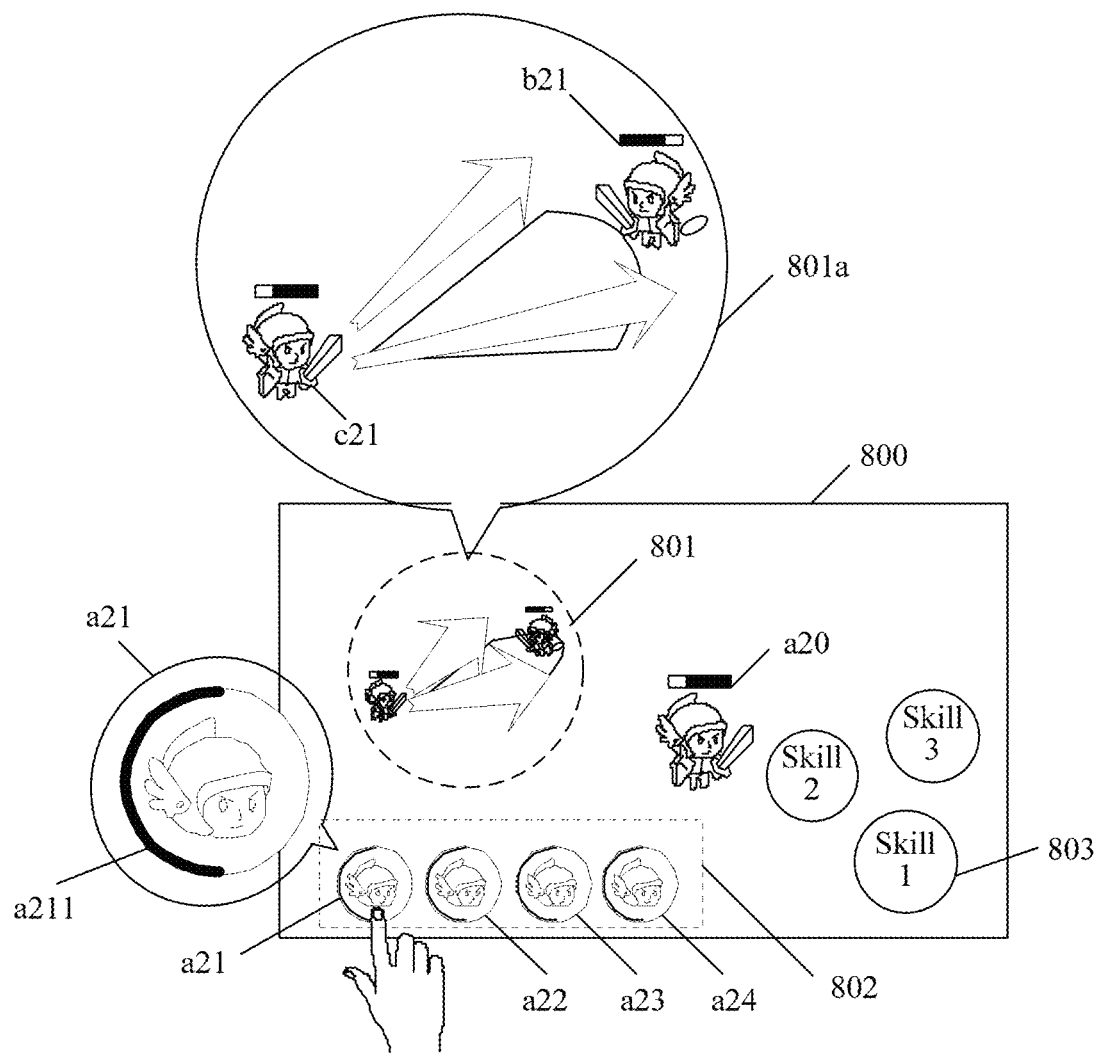
FIG. 6 is a second schematic diagram of a GUI in an information processing method according to some embodiments of the present technology.

Further, the terminal obtains, from the server, the status attribute information of the at least one second character object that is synchronized by the another terminal, that is, obtains the status attribute information of the at least one character object associated with the at least one character operation object in the character container object in the GUI. It may be understood that, the terminal obtains the status attribute information of the second character object that belongs to the same group as the user character object, and performs, in the first preset display manner, rendering on the status attribute information of the second character object in the at least one window location corresponding to the associated character operation object. FIG. 6 is a second schematic diagram of the GUI in the information processing method according to this embodiment of the present technology. As shown in FIG. 6, an example in which the status attribute information is a blood value is used. An area at an outer circle of a character operation object a21 in the character selection area 802 is used as a blood groove display area a211, and a current blood value of a corresponding second character object is represented by using a proportion of a blood value in the blood groove display area to the blood groove display area. Certainly, in this embodiment of the present technology, a manner of performing rendering on the status attribute information in a window location corresponding to the character operation object associated with the second character object is not limited to what is shown in FIG. 6.

By means of the technical solution in this embodiment of the present technology, on one hand, by means of a window location in a character container object deployed in a character selection area in a GUI, rendering is performed, in a corresponding window location, on a character operation object associated with a second character object that belongs to a same group as a user character object, so that a user can rapidly obtain a vision image of the corresponding second character object by means of a vision obtaining gesture on the character operation object, thereby greatly improving operation experience of the user in an interaction process. On the other hand, status attribute information of the second character object associated with the character operation object in the character container object is obtained by synchronizing status attribute information of the second character object (that is, a teammate) that belongs to the same group, and rendering is performed on the status attribute information in a corresponding window location in a particular manner, that is, the status attribute information of the second character object (that is, the teammate) is reflected on a corresponding character operation object (a UI avatar), so that the user can rapidly learn the status attribute information of the second character object (that is, the teammate), thereby improving operation experience of the user in an information exchange process.

Figure 7:
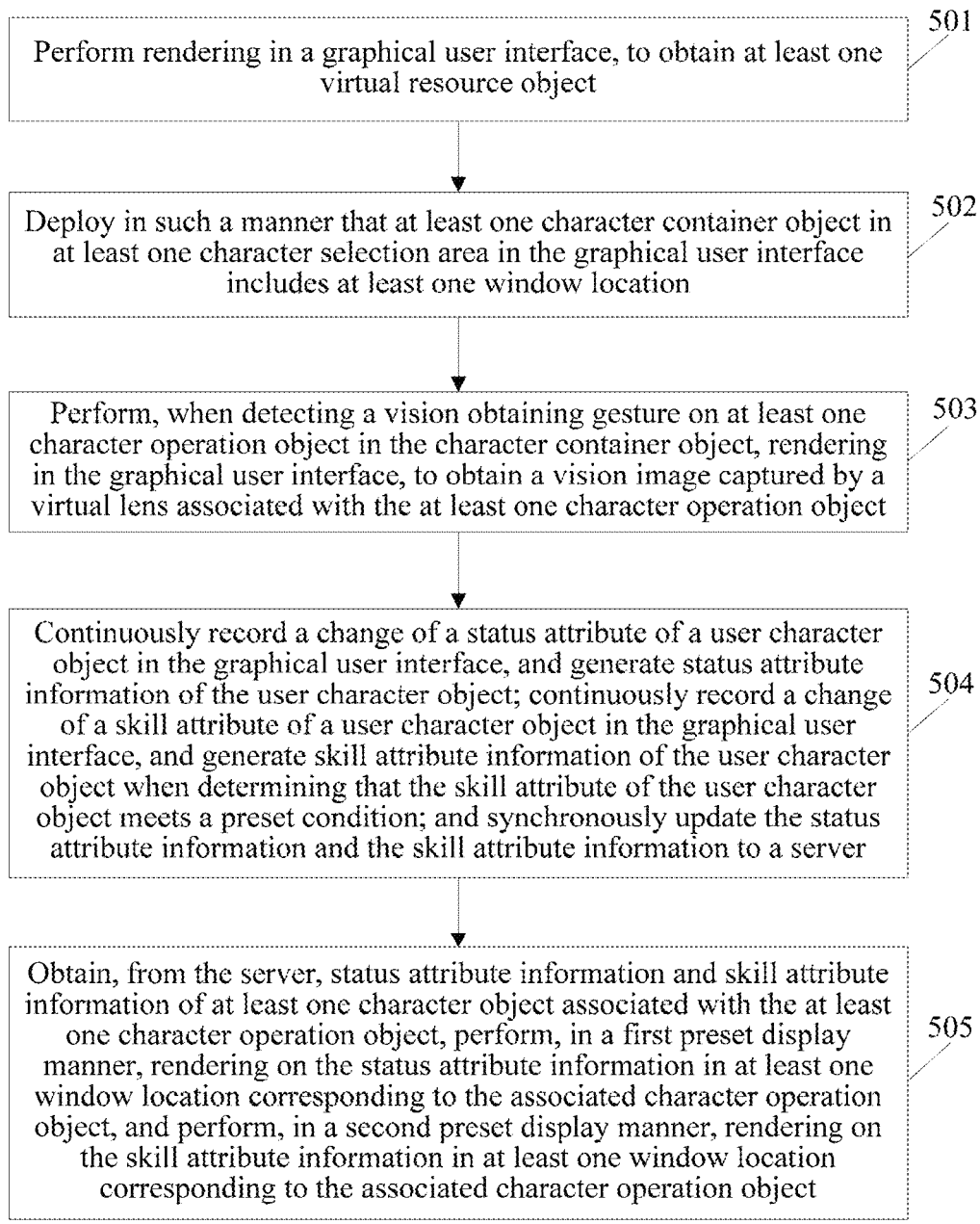
FIG. 7 is a schematic flowchart of an information processing method according to some embodiments of the present technology.

FIG. 7 is a schematic flowchart of the information processing method according to some embodiments of the present technology. The information processing method is applied to a terminal. A software application is executed on a processor of the terminal and rendering is performed on a display of the terminal, to obtain a GUI. The processor, the GUI, and the software application are implemented in a game system. As shown in FIG. 7, Operation 501: Perform rendering in the GUI, to obtain at least one virtual resource object.

Operation 502: Deploy in such a manner that at least one character container object in at least one character selection area in the GUI includes at least one window location.

In this embodiment, the GUI includes the at least one character selection area, the character selection area includes the at least one character container object, and the character container object includes the at least one window location. Corresponding character operation objects are carried in at least some window locations. The character operation object may be represented by using an identifier (the identifier may be an avatar) of a character object associated with the character operation object in the GUI. Herein, the character object associated with the character operation object belongs to a same group as a user character object. A manner of rendering on the character container object in the character selection area includes, but is not limited to: a bar shape or an annular shape, that is, the character container object may be represented by using a character selection bar object or a character selection wheel object.

Specifically, referring to FIG. 3, a GUI 800 obtained through rendering on the display of the terminal includes the at least one virtual resource object. The virtual resource object includes at least one user character object a10. A user of the terminal may perform information exchange by using the GUI, that is, input a user command. The user character object a10 can perform a first virtual operation based on a first user command detected by the terminal, where the first virtual operation includes, but is not limited to: a moving operation, a physical attack operation, a skill attack operation, and the like. It may be understood that, the user character object a10 is a character object controlled by the user of the terminal. In the game system, the user character object a10 can perform a corresponding action in the GUI based on an operation of the user. In an implementation, the GUI 800 further includes at least one skill object 803, and the user may control, by means of a skill release operation, the user character object a10 to perform a corresponding skill release operation.

In the example shown in FIG. 3, the GUI includes a character selection area 802, and a character container object is deployed in the character selection area 802. In this example, the character container object is represented by using a character selection bar object (that is, the character container object presents a display effect of a bar shape). The character container object includes at least one window location, and rendering is performed, in a corresponding window location, on a character operation object associated with a second character object that belongs to a same group as the user character object. An example in which the character operation object is represented by using an avatar is used, that is, the character selection area 802 includes at least one avatar. The at least one avatar is respectively in a one-to-one correspondence with at least one second character object that belongs to the same group as the user character object. As shown in FIG. 3, a five-to-five application scenario is used in this example. There are four character objects that belong to a same group as the user character object a10, and correspondingly, there are four character operation objects in the character selection area 802, for example, a character operation object a11, a character operation object a12, a character operation object a13, and a character operation object a14 shown in FIG. 3. It may be understood that, the four character operation objects in the character selection area 802 are in a one-to-one correspondence with four second character objects that belong to the same group as the user character object. This embodiment may be applied to an application scenario of a battle of multiple persons including at least two group members.

In an implementation, a mutual location relationship between at least two character operation objects in the character selection area 802 is determined according to a time order of entering the game system by the at least two character operation objects. As shown in FIG. 3, a time that a character object associated with the character operation object a11 enters the game system is earlier than a time of a character object associated with the character operation object a12, a time of the character operation object a13, and a time of the character operation object a14, and so on, and details are not described herein.

Operation 503: Perform, when detecting a vision obtaining gesture on at least one character operation object in the character container object, rendering in the GUI, to obtain a vision image captured by a virtual lens associated with the at least one character operation object.

Herein, when detecting the vision obtaining gesture on the at least one character operation object in the character container object, the method further includes: generating and sending a first instruction, where the first instruction is configured to invoke the virtual lens associated with the at least one character operation object and control the virtual lens to capture the vision image; and obtaining, in a process of detecting the vision obtaining gesture, the vision image captured by the virtual lens.

Specifically, referring to FIG. 3, an example in which the vision obtaining gesture is a long press gesture is used. When a long press gesture on a character operation object (such as the character operation object a11 shown in FIG. 3) in the character selection area 802 is detected, the terminal generates a first instruction, establishes, based on the first instruction, a network connection to an another terminal corresponding to a character object associated with the character operation object, and sends, based on the network connection, the first instruction to the another terminal corresponding to the character object associated with the character operation object, to control the another terminal to invoke, based on the first instruction, a virtual lens of the another terminal, and capture a vision image by using the virtual lens. In a process of continuously detecting the long press gesture on the character operation object a11, the terminal obtains, in real time, the vision image sent by the another terminal, and performs rendering in the GUI, to obtain the vision image. As shown in a vision image display area 801 and an enlarged view 801a of the vision image display area 801 shown in FIG. 3, a vision image corresponding to the character operation object a11 is displayed in the vision image display area 801; and the vision image is an image that can be viewed by a user controlling the character object associated with the character operation object a11. For example, if the character object c11 associated with the character operation object a11 currently performs a release operation on a skill object towards another character object b11, a vision image in which the character object c11 associated with the character operation object a11 currently performs the release operation on the skill object towards the another character object b11 is displayed in the vision image display area 801 in the GUI 800, as shown in FIG. 3. It may be understood that, by means of the vision obtaining gesture (such as the long press gesture), the terminal can rapidly switch to a vision image of another corresponding terminal, so that the user of the terminal can rapidly obtain a vision image of a teammate.

In an implementation, a second instruction is generated when the vision obtaining gesture stops, and invoking the virtual lens associated with the at least one character operation object is stopped based on the second instruction.

Specifically, an example in which the vision obtaining gesture is the long press gesture is used. The second instruction is generated when the long press gesture stops, and invoking the virtual lens associated with the at least one character operation object is stopped based on the second instruction; and the network connection between the terminal and the another terminal is terminated.

Operation 504: Continuously record a change of a status attribute of a user character object in the GUI, and generate status attribute information of the user character object; continuously record a change of a skill attribute of a user character object in the GUI, and generate skill attribute information of the user character object when determining that the skill attribute of the user character object meets a preset condition; and synchronously update the status attribute information and the skill attribute information to a server.

In this embodiment, on one hand, when the terminal continuously records the change of the status attribute of the user character object in the GUI, that is, in a process in which the user character object performs information exchange with another character object, the terminal records the change of the status attribute of the user character object in real time, to obtain the status attribute information of the user character object, where the status attribute information includes, but is not limited to: a blood value, a hit point, or the skill attribute information of the user character object. The terminal synchronizes the obtained the status attribute information of the user character object to the server in real time. Correspondingly, for the at least one second character object that belongs to the same group as the user character object, a terminal corresponding to the second character object also obtains status attribute information of the second character object in real time and synchronizes the status attribute information to the server.

On the other hand, when the terminal continuously records the change of the skill attribute of the user character object in the GUI, that is, in a process in which the user character object performs information exchange with another character object, the terminal records the change of the skill attribute of the user character object in real time. After the user character object releases a skill object, the skill object can be restored after a period of time, that is, the skill object can be released again after the period of time. Therefore, in this embodiment, the terminal records the change of the skill attribute of the user character object in real time, determines, when determining that at least one skill object can be released, that the skill attribute of the user character object meets the preset condition, and generates the skill attribute information of the user character object, where the skill attribute information represents that the user character object can release the at least one skill object. The terminal synchronizes the obtained skill attribute information of the user character object to the server in real time. Correspondingly, for the at least one second character object that belongs to the same group as the user character object, the terminal corresponding to the second character object also obtains the skill attribute information of the second character object in real time and synchronizes the skill attribute information to the server.

Operation 505: Obtain, from the server, status attribute information and skill attribute information of at least one character object associated with the at least one character operation object, perform, in a first preset display manner, rendering on the status attribute information in at least one window location corresponding to the associated character operation object, and perform, in a second preset display manner, rendering on the skill attribute information in at least one window location corresponding to the associated character operation object.

Figure 8:
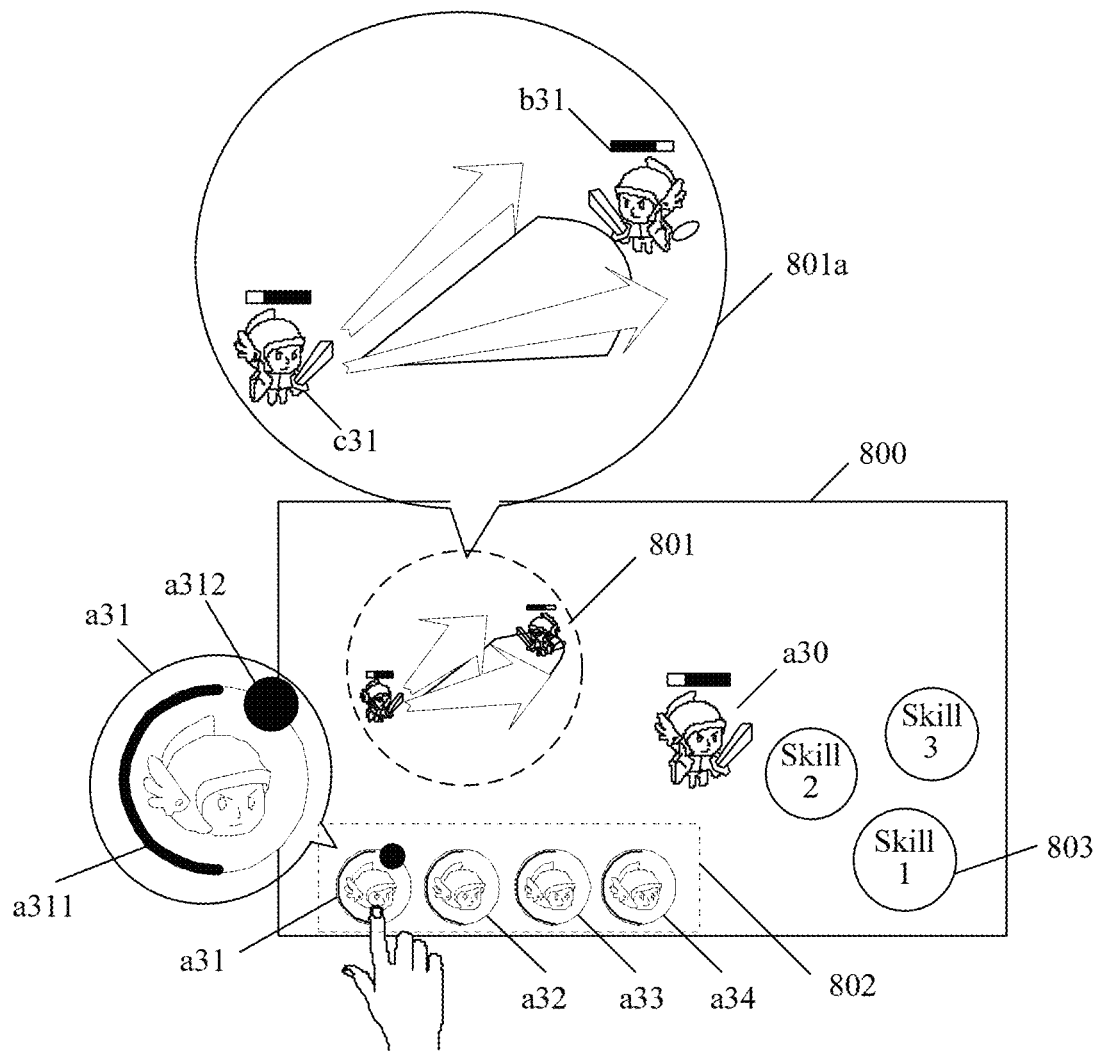
FIG. 8 is a third schematic diagram of a GUI in an information processing method according to some embodiments of the present technology.

Herein, on one hand, the terminal obtains, from the server, the status attribute information of the at least one second character object that is synchronized by the another terminal, that is, obtains the status attribute information of the at least one character object associated with the at least one character operation object in the character container object in the GUI. It may be understood that, the terminal obtains the status attribute information of the second character object that belongs to the same group as the user character object, and performs, in the first preset display manner, rendering on the status attribute information of the second character object in the at least one window location corresponding to the associated character operation object. FIG. 8 is a third schematic diagram of the GUI in the information processing method according to this embodiment of the present technology. As shown in FIG. 8, an example in which the status attribute information is a blood value is used. An area at an outer circle of a character operation object a31 in the character selection area 802 is used as a blood groove display area a311, and a current blood value of a corresponding second character object is represented by using a proportion of a blood value in the blood groove display area to the blood groove display area a311. Certainly, in this embodiment of the present technology, a manner of performing rendering on the status attribute information in a window location corresponding to the character operation object associated with the second character object is not limited to what is shown in FIG. 8.

On the other hand, the terminal obtains, from the server, the skill attribute information of the at least one second character object that is synchronized by the another terminal, that is, obtains the skill attribute information of the at least one character object associated with the at least one character operation object in the character container object in the GUI. It may be understood that, the terminal obtains the skill attribute information of the second character object that belongs to the same group as the user character object, and performs, in the first preset display manner, rendering on the skill attribute information of the second character object in the at least one window location corresponding to the associated character operation object, where the skill attribute information displayed in the character operation object represents that a corresponding second character object currently can release at least one skill object. Referring to FIG. 8, at the upper right corner of a character operation object a31 in the character container object, the skill attribute information is represented by using a circular identifier a312. When the character operation object displays the circular identifier a312, it indicates that a second character object associated with the character operation object currently can release at least one skill object. When the character operation object does not display the circular identifier, it indicates that the second character object associated with the character operation object currently cannot release any skill object. Certainly, in this embodiment of the present technology, a manner of performing rendering on the status attribute information in a window location corresponding to the character operation object associated with the second character object is not limited to what is shown in FIG. FIG. 8.

By means of the technical solution in this embodiment of the present technology, on one hand, by means of a window location in a character container object deployed in a character selection area in a GUI, rendering is performed, in a corresponding window location, on a character operation object associated with a second character object that belongs to a same group as a user character object, so that a user can rapidly obtain a vision image of the corresponding second character object by means of a vision obtaining gesture on the character operation object, thereby greatly improving operation experience of the user in an interaction process. On the other hand, status attribute information and skill attribute information of the second character object associated with the character operation object in the character container object are obtained by synchronizing status attribute information and skill attribute information of the second character object (that is, a teammate) that belongs to the same group, and rendering is performed on the status attribute information and the skill attribute information in corresponding window locations in particular manners, that is, the status attribute information and the skill attribute information of the second character object (that is, the teammate) are reflected on corresponding character operation objects (UI avatars), so that the user can rapidly learn the status attribute information and the skill attribute information of the second character object (that is, the teammate), thereby improving operation experience of the user in an information exchange process.

Figure 9:
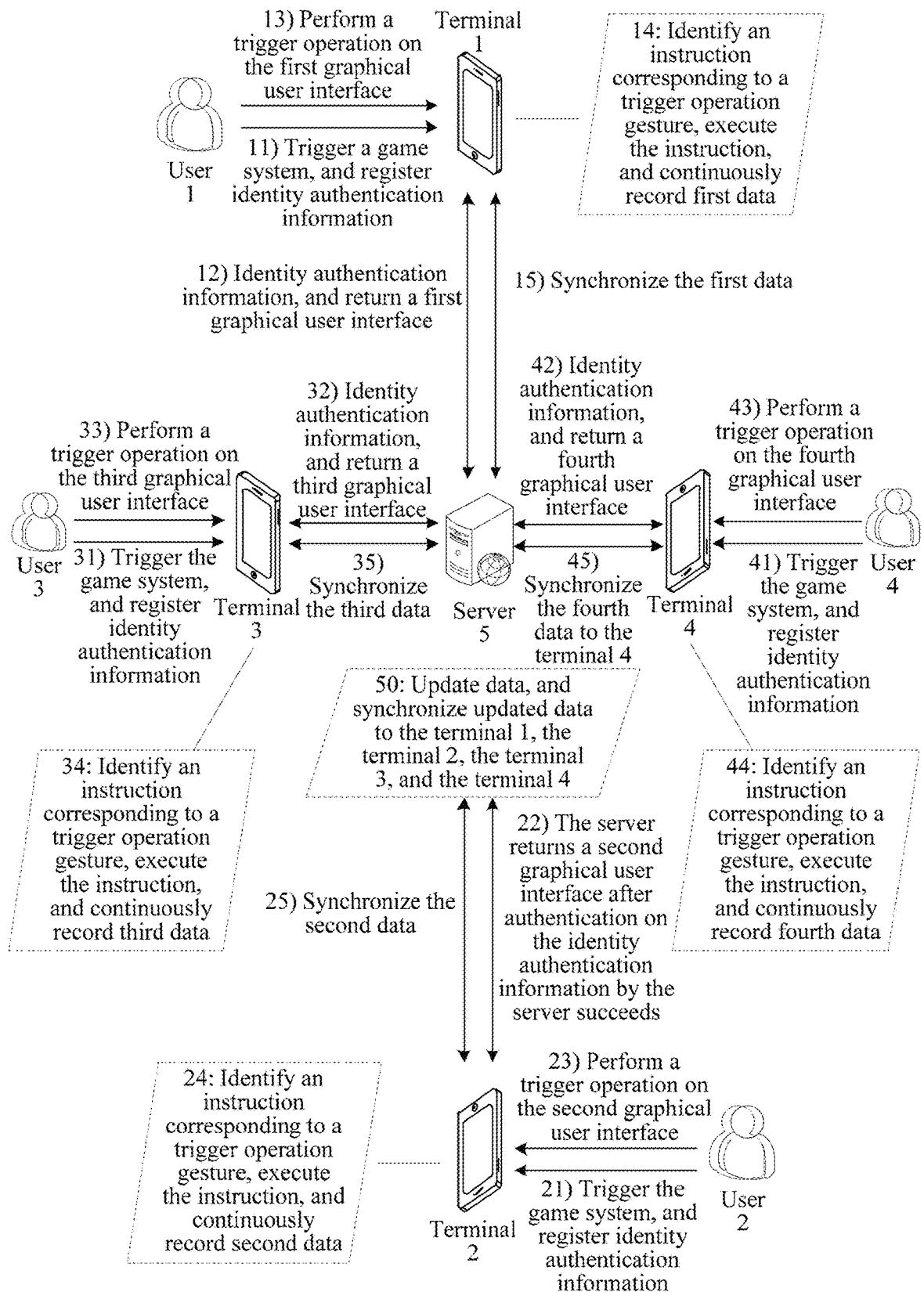
FIG. 9 is a schematic application diagram of interaction in an information processing method according to some embodiments of the present technology.

Based on the method in accordance with some embodiments, a two-to-two application scenario is used as an example for detailed description below. The two-to-two application scenario is an application scenario in which a first character object controlled by a terminal 1 and a second character object controlled by a terminal 2 belong to a first group and perform information exchange with a third character object controlled by a terminal 3 and a fourth character object controlled by a terminal 4. For other application scenarios, refer to descriptions in this application scenario, and details are not described in this embodiment again. FIG. 9 is a schematic application diagram of interaction in the information processing method according to this embodiment of the present technology. As shown in FIG. 9, in this application scenario, the terminal 1, the terminal 2, the terminal 3, and the terminal 4, and a server 5 are included. A user 1 performs triggering and control by using the terminal 1, a user 2 performs triggering and control by using the terminal 2, a user 3 performs triggering and control by using the terminal 3, and a user 4 performs triggering and control by using the terminal 4; and the method includes the following operations:

For the user 1, Operation 11: The user 1 triggers a game system and registers identity authentication information, where the identity authentication information may be a user name and a password.

Operation 12: The terminal 1 transmits the obtained identity authentication information to the server 5, and the server 5 performs identity authentication, and returns a first GUI to the terminal 1 after the identity authentication succeeds, where the first GUI includes a first character object, the first character object can perform a virtual operation based on a trigger operation of the user 1, and the virtual operation includes a moving operation of the first character object, an attack operation or a skill release operation of the first character object for another character object, and the like.

For the user 2, Operation 21: The user 2 triggers the game system and registers identity authentication information, where the identity authentication information may be a user name and a password.

Operation 22: The terminal 2 transmits the obtained identity authentication information to the server 5, and the server 5 performs identity authentication, and returns a second GUI to the terminal 2 after the identity authentication succeeds, where the second GUI includes a second character object, the second character object can perform a virtual operation based on a trigger operation of the user 2, and the virtual operation includes a moving operation of the second character object, an attack operation or a skill release operation of the second character object for another character object, and the like.

In this embodiment, the first character object on which rendering is performed in the terminal 1 and the second character object on which rendering is performed in the terminal 2 belong to a same group, and a window location of a character container object in the first GUI in the terminal 1 includes a character operation object associated with the second character object. When the character operation object is operated by a vision obtaining gesture (such as a long press gesture), the terminal 1 can invoke a virtual lens of the terminal 2, to obtain a vision image of the terminal 2 by using the virtual lens, and when the vision obtaining gesture (such as the long press gesture) continuously operates, the terminal 1 display the vision image. Correspondingly, a window location of a character container object in the second GUI in the terminal 2 includes a character operation object associated with the first character object, and similar to the terminal 1, when the character operation object of the terminal 2 is operated by a vision obtaining gesture (such as a long press gesture), the terminal 2 can invoke a virtual lens of the terminal 1, to obtain a vision image of the terminal 1 by using the virtual lens; and details are not described herein again.

For the user 3, Operation 31: The user 3 triggers the game system and registers identity authentication information, where the identity authentication information may be a user name and a password.

Operation 32: The terminal 3 transmits the obtained identity authentication information to the server 5, and the server 5 performs identity authentication, and returns a third GUI to the terminal 3 after the identity authentication succeeds, where the third GUI includes a third character object, the third character object can perform a virtual operation based on a trigger operation of the user 3, the virtual operation includes a moving operation of the third character object, an attack operation or a skill release operation of the third character object for another character object, and the like.

For the user 4, Operation 41: The user 4 triggers the game system and registers identity authentication information, where the identity authentication information may be a user name and a password.

Operation 42: The terminal 4 transmits the obtained identity authentication information to the server 5, and the server 5 performs identity authentication, and returns a fourth GUI to the terminal 5 after the identity authentication succeeds, where the fourth GUI includes a fourth character object, the fourth character object can perform a virtual operation based on a trigger operation of the user 5, and the virtual operation includes a moving operation of the fourth character object, an attack operation or a skill release operation of the fourth character object for another character object, and the like.

Similar to the terminal 1 and the terminal 2, rendering is performed in each of the terminal 3 and the terminal, to obtain a character operation object associated with another character object that belongs to the same group 4. When a vision obtaining gesture (such as a long press gesture) on the character operation object is detected, a vision image of the character object associated with the character operation object is obtained; and details are not described herein again.

In this embodiment, the user 1 and the user 2 are grouped into the first group, and the user 3 and the user 4 are grouped into a second group; and a character object in the first group and a character object in the second group can serve as information exchange objects based on a trigger operation.

Till now, login operations and initialization operations of the user 1, the user 2, the user 3, and the user 4 in the game system are completed.

For the user 1, Operation 13: The user 1 performs a trigger operation on the first GUI presented by the terminal 1, where the trigger operation may be performed on any virtual resource object in the first GUI, including a skill release operation on any skill object, an information exchange operation (which may be understood as a physical attack operation) on any character object, a moving operation of the first character object, and the like. In this embodiment, the trigger operation is a vision obtaining gesture operation on a character operation object in the character container object in the first GUI.

Operation 14: The terminal 1 identifies, when obtaining a trigger operation, an instruction corresponding to the trigger operation gesture; executes the instruction, for example, executes a skill release instruction for a corresponding operation object, executes an information exchange instruction (such as a physical attack instruction) for a corresponding character object, or executes a moving instruction; and in a process of executing the instruction, records a change of corresponding data.

Operation 15: Use changed data as first data corresponding to the terminal 1 and synchronize the first data to the server 5.

For the user 2, Operation 23: The user 2 performs a trigger operation on the second GUI presented by the terminal 2, where the trigger operation may be performed on any virtual resource object in the second GUI, including a skill release operation on any skill object, an information exchange operation (which may be understood as a physical attack operation) on any character object, a moving operation of the second character object, and the like. In this embodiment, the trigger operation is a vision obtaining gesture operation on a character operation object in the character container object in the second GUI.

Operation 24: The terminal 2 identifies, when obtaining a trigger operation, an instruction corresponding to the trigger operation gesture; executes the instruction, for example, executes a skill release instruction for a corresponding operation object, executes an information exchange instruction (such as a physical attack instruction) for a corresponding character object, or executes a moving instruction; and in a process of executing the instruction, records a change of corresponding data.

Operation 25: Use changed data as second data corresponding to the terminal 2 and synchronize the second data to the server 5.

For the user 3, Operation 33: The user 3 performs a trigger operation on the third GUI presented by the terminal 3, where the trigger operation may be performed on any virtual resource object in the third GUI, including a skill release operation on any skill object, an information exchange operation (which may be understood as a physical attack operation) on any character object, a moving operation of the third character object, and the like. In this embodiment, the trigger operation is a vision obtaining gesture operation on a character operation object in the character container object in the third GUI.

Operation 34: The terminal 3 identifies, when obtaining a trigger operation, an instruction corresponding to the trigger operation gesture; executes the instruction, for example, executes a skill release instruction for a corresponding operation object, executes an information exchange instruction (such as a physical attack instruction) for a corresponding character object, or executes a moving instruction; and in a process of executing the instruction, records a change of corresponding data.

Operation 35: Use changed data as third data corresponding to the terminal 3 and synchronize the third data to the server 5.

For the user 4, Operation 43: The user 4 performs a trigger operation on the fourth GUI presented by the terminal 4, where the trigger operation may be performed on any virtual resource object in the fourth GUI, including a skill release operation on any skill object, an information exchange operation (which may be understood as a physical attack operation) on any character object, a moving operation of the fourth character object, and the like. In this embodiment, the trigger operation is a vision obtaining gesture operation on a character operation object in the character container object in the fourth GUI.

Operation 44: The terminal 4 identifies, when obtaining a trigger operation, an instruction corresponding to the trigger operation gesture; executes the instruction, for example, executes a skill release instruction for a corresponding operation object, executes an information exchange instruction (such as a physical attack instruction) for a corresponding character object, or executes a moving instruction; and in a process of executing the instruction, records a change of corresponding data.

Operation 45: Use changed data as fourth data corresponding to the terminal 4 and synchronize the fourth data to the server 5.

For the server 5, Operation 50: Update data based on the first data synchronized by the terminal 1, the second data synchronized by the terminal 2, the third data synchronized by the terminal 3, and the fourth data synchronized by the terminal 4, and respectively synchronize updated data to the terminal 1, the terminal 2, the terminal 3, and the terminal 4.

Referring to the descriptions of the foregoing method embodiment, an actual application scenario is used as an example to describe this embodiment of the present technology as follows: This application scenario is related to Multiplayer Online Battle Arena Games (MOBA). In MOBA, related terms are as follows: 1) UI layer, that is, an icon in a GUI; 2) skill indicator: a special effect, a halo, or an operation used to supplement skill release; 3) virtual lens, which may be understood as a camera in the game; and 4) mini map: a scaled-down version of a large map, which may be understood as a radar map, where information and locations of two parties are displayed in the map.

Figure 10:
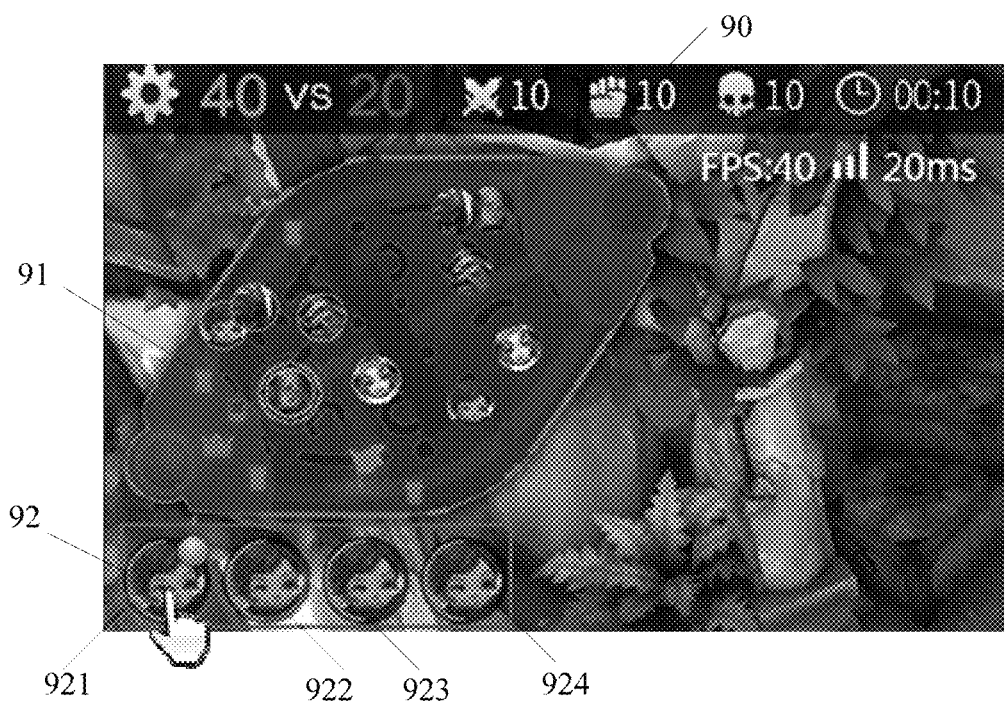
FIG. 10 is a fourth schematic diagram of a GUI in an information processing method according to some embodiments of the present technology.

FIG. 10 is a fourth schematic diagram of the GUI in the information processing method according to this embodiment of the present technology. This example is based on an application scenario used in an actual interaction process. Referring to FIG. 10, in this embodiment, a GUI 90 obtained through rendering includes a character selection area 92, the character selection area 92 includes a character container object, and in this example, the character container object includes four window locations. One character operation object is obtained through rendering in each window location, including a character operation object 921, a character operation object 922, a character operation object 923, and a character operation object 924. Each character operation object is associated with one character object, and the four character objects belong to a same group as a user character object. In this example, the GUI 90 further includes an area 91. When a vision obtaining gesture on any character operation object in the character selection area 92 is not detected, a mini map (referring to FIG. 10) of deployment and layout of two parties is obtained through rendering in the area 91. When a vision obtaining gesture (such as a long press gesture) on any character operation object (such as the character operation object 921) in the character selection area 92 is detected, the terminal invokes, by using an instruction, a virtual lens corresponding to a character object associated with the character operation object 921, to control the virtual lens to capture a vision image and return the vision image to the GUI 90 in the terminal. A vision image (not shown in FIG. 10) of the character object associated with the corresponding character operation object 921 is obtained through rendering in the area 91. In this way, it is convenient for a user to rapidly obtain a vision image of a corresponding second character object by means of a vision obtaining gesture on the character operation object, thereby greatly improving operation experience of the user in an interaction process.

Based on the above, in some embodiments, an information processing method, includes: at a first gaming terminal of a plurality of gaming terminals engaged in a group game, wherein the first gaming terminal corresponds to a first game player, and a second gaming terminal of the plurality of gaming terminals corresponds to a second game player distinct from the first game player, and wherein the first gaming terminal comprises one or more processors and memory: displaying a first game scene from a first viewing perspective corresponding to the first game player in the group game (e.g., the game scene as viewed by the first user at the first gaming terminal, the game scene may be a first person view, a bird's eye view, or a God's eye view, depending on the game design). In some embodiments, the first game scene displays a portion of the game world, and not all game characters in the game are visible in the first game scene. For example, different team members of the first game player may be located at different portions of the game world, and the user has to move the game characters or manually pan the viewing window (e.g., by swipe gesture, or by moving a controller) to see other portions of the game world. Each game terminal may display a different view of the game world, depending on the location of the game characters that are controlled by the different users.

The method further includes: displaying, concurrently with the first game scene, a game avatar corresponding to the second game player. For example, in an area of the game user interface, the user's team members are listed in a team member selection area as different avatars representing the game characters controlled by the different team members. In some embodiments, the avatars also include status indicators to indicate their levels, health, skills, etc. The method further includes: while displaying the first game scene from the first viewing perspective corresponding to the first game player, detecting a user input directed to the game avatar corresponding to the second game player, wherein the user input meets predefined team-view criteria; in response to detecting the user input that is directed to the game avatar corresponding to the second game player, and in accordance with a determination that the user input meets the predefined team-view criteria: retrieving a second game scene from a second viewing perspective corresponding to the second game player, wherein the second game scene is distinct from the first game scene and the second game is currently displayed at the second game terminal; and displaying at least a portion of the second game scene at the first gaming terminal. For example, the team-view criteria are met when the user input corresponds to the "vision obtaining gesture", such as a long press on the avatar of a team member, or a tap on the avatar, or a deep press on the avatar. In response to the selection of a team member and the gesture meeting the requirement for the team-viewing criteria, the first terminal requests, e.g., from the game server, or from the second terminal directly, the data for displaying the second game scene as seen by the user at the second gaming terminal. In some embodiments, the second game scene is displayed in a pop-up window shown above the selected avatar. In some embodiments, the second game scene is displayed overlaid on the first game scene briefly for as long as the gesture is not terminated.

In some embodiments, displaying at least the portion of the second game scene includes continuing to update the second game screen displayed at the first gaming terminal in accordance with updates made to the second game scene currently displayed at the second gaming terminal. This is so that the player can see the movement and actions of the characters in the game scenes as the game develops during the gesture input.

In some embodiments, while displaying the second game scene at the first gaming terminal, detecting termination of the user input (e.g., lift-off of the contact from the avatar, or moving away from the avatar to a second avatar to trigger the display of game scene of yet another game player): in response to detecting the termination of the user input: in accordance with a determination that the user input has met temporary-display criteria (e.g., a touch-hold with intensity below a predefined intensity threshold, or a touch-hold with less than a predefined threshold duration), ceasing to display at least the portion of the second game scene at the first gaming terminal upon termination of the input (e.g., upon lift-off of the contact); and in accordance with a determination that the user input has met sustained-display criteria (e.g., a press input with intensity above the predefined intensity threshold, or a touch-hold with a duration longer than the predefined threshold duration), maintaining display of the portion of the second game scene at the first gaming terminal while continuing to update the second game screen displayed at the first gaming terminal in accordance with updates made to the second game scene currently displayed at the second gaming terminal (e.g., the pop-up window is pinned at a predefined location on the game UI, e.g., in a dedicated area for displaying game scenes from other game players).

In some embodiments, the method further include: monitoring a status of the second game player (e.g., a skills, the status for getting ready (based on requirements on wait time, points, items, etc.) to release a special skill or attack); determining whether the status of the second game player meets predefined status-event criteria (e.g., the status-event criteria are met when the character is ready to release a skill or predefined attack); and in response to determining that the status of the second game player meets the predefined status-event criteria: in accordance with a determination that the second game scene from the viewing perspective of the second game player is not currently displayed at the first gaming terminal, displaying the second game scene from the viewing perspective of the second game player at the first gaming terminal; and in accordance with a determination that the second game scene from the viewing perspective of the second game player is currently displayed at the first gaming terminal, maintaining display of the second game scene from the viewing perspective of the second game player at the first gaming terminal. In some embodiments, the status-event criteria are met by the status of the second game player when the second game player is ready to release a predefined game move.

In some embodiments, the method includes: while displaying the second game scene at the first gaming terminal, detecting a second user input that meets scene-capture criteria (e.g., a screen capture input is detected); in response to detecting the second user input that meets the scene-capture criteria: capture the first game scene and the second game scene that are currently displayed at the first gaming terminal; and storing the first game scene and the second game scene in a library that is accessible through a post-game analysis interface of the group game. In some embodiments, the post-game analysis interface is concurrently displayed to multiple users from the same team, concurrently with a group chat interface, so that the team members can go through the game strategy and perform better in future games.

In some embodiments, the method include: receiving an indication that the second gaming terminal has requested to display the first game scene at the second gaming terminal; and in response to receiving the indication that the second gaming terminal has requested to display the first game scene at the second gaming terminal, displaying an indicator in association with the avatar corresponding to the second game player while the first game scene remains displayed at the second gaming terminal. For example, if other users have selected the first game player's avatar on their terminals to show the game scene as viewed by the first game player, the avatars of those other users are highlighted or have an "eye" indicator displayed next to them, so that the user at the first terminal knows who else on the team can see what he is seeing.

In some embodiments, when two team members are exchanging game views (e.g., each showing the game scene of the other), the first terminal optionally eliminates the replica of the first game scene from the view of the second game scene that is obtained from the second gaming terminal.

Other details of the method are disclosed with respect to other embodiments, and may be combined with the features of this method without limitation. In the interest of brevity, all features are not exhaustively repeated herein.

Figure 11:
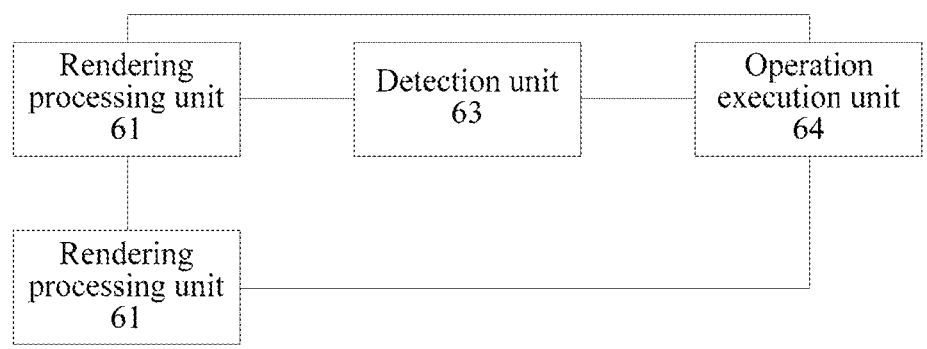
FIG. 11 is a schematic structural diagram of a terminal according to some embodiments of the present technology.

This embodiment of the present technology further provides a terminal. FIG. 11 is a schematic structural diagram of the terminal according to some embodiments of the present technology. As shown in FIG. 11, the terminal includes: a rendering processing unit 61, a deployment unit 62, a detection unit 63, and an operation execution unit 64.

The rendering processing unit 61 is configured to: execute a software application and perform rendering, to obtain a GUI; and perform rendering in the GUI, to obtain at least one virtual resource object; and is further configured to: perform rendering in the GUI, to obtain a vision image captured by a virtual lens associated with at least one character operation object that is obtained by the operation execution unit 64.

The deployment unit 62 is configured to: deploy in such a manner that at least one character container object in at least one character selection area in the GUI includes at least one window location.

The detection unit 63 is configured to detect a vision obtaining gesture on the at least one character operation object in the character container object.

The operation execution unit 64 is configured to obtain, when the detection unit 63 detects the vision obtaining gesture on the at least one character operation object in the character container object, the vision image captured by the virtual lens associated with the at least one character operation object.

In this embodiment, the GUI includes the at least one character selection area, the character selection area includes the at least one character container object, and the character container object includes the at least one window location. Corresponding character operation objects are carried in at least some window locations. The character operation object may be represented by using an identifier (the identifier may be an avatar) of a character object associated with the character operation object in the GUI. Herein, the character object associated with the character operation object belongs to a same group as a user character object. A manner of rendering on the character container object in the character selection area includes, but is not limited to: a bar shape or an annular shape, that is, the character container object may be represented by using a character selection bar object or a character selection wheel object.

Specifically, referring to FIG. 3, a GUI 800 obtained through rendering by the rendering processing unit 61 includes the at least one virtual resource object. The virtual resource object includes at least one user character object a10. A user of the terminal may perform information exchange by using the GUI, that is, input a user command. The user character object a10 can perform a first virtual operation based on a first user command detected by the terminal, where the first virtual operation includes, but is not limited to: a moving operation, a physical attack operation, a skill attack operation, and the like. It may be understood that, the user character object a10 is a character object controlled by the user of the terminal. In the game system, the user character object a10 can perform a corresponding action in the GUI based on an operation of the user. The GUI 800 further includes at least one skill object 803, and the user may control, by means of a skill release operation, the user character object a10 to perform a corresponding skill release operation.

In the example shown in FIG. 3, the deployment unit 62 deploys a character selection area 802 in the GUI, and deploys a character container object in the character selection area 802. In this example, the character container object is represented by using a character selection bar object (that is, the character container object presents a display effect of a bar shape). The character container object includes at least one window location, and rendering is performed, in a corresponding window location, on a character operation object associated with a second character object that belongs to a same group as the user character object. An example in which the character operation object is represented by using an avatar is used, that is, the character selection area 802 includes at least one avatar. The at least one avatar is respectively in a one-to-one correspondence with at least one second character object that belongs to the same group as the user character object. As shown in FIG. 3, a five-to-five application scenario is used in this example. There are four character objects that belong to a same group as the user character object a10, and correspondingly, there are four character operation objects in the character selection area 802, for example, a character operation object a11, a character operation object a12, a character operation object a13, and a character operation object a14 shown in FIG. 3. It may be understood that, the four character operation objects in the character selection area 802 are in a one-to-one correspondence with four second character objects that belong to the same group as the user character object. This embodiment may be applied to an application scenario of a battle of multiple persons including at least two group members.

In an implementation, a mutual location relationship between at least two character operation objects in the character selection area 802 is determined according to a time order of entering the game system by the at least two character operation objects. As shown in FIG. 3, a time that a character object associated with the character operation object a11 enters the game system is earlier than a time of a character object associated with the character operation object a12, a time of the character operation object a13, and a time of the character operation object a14, and so on, and details are not described herein.

In this embodiment, the operation execution unit 64 is configured to: generate and send a first instruction when the detection unit 63 detects the vision obtaining gesture on the at least one character operation object in the character container object, where the first instruction is configured to invoke the virtual lens associated with the at least one character operation object and control the virtual lens to capture the vision image; and obtain, in a process in which the detection unit 63 detects the vision obtaining gesture, the vision image captured by the virtual lens.

Specifically, referring to FIG. 3, an example in which the vision obtaining gesture is a long press gesture is used. When the detection unit 63 detects a long press gesture on a character operation object (such as the character operation object a11 shown in FIG. 3) in the character selection area 802, the operation execution unit 64 generates a first instruction, establishes, based on the first instruction, a network connection to an another terminal corresponding to a character object associated with the character operation object, and sends, based on the network connection, the first instruction to the another terminal corresponding to the character object associated with the character operation object, to control the another terminal to invoke, based on the first instruction, a virtual lens of the another terminal, and capture a vision image by using the virtual lens. In a process in which the detection unit 63 continuously detects the long press gesture on the character operation object a11, the operation execution unit 64 obtains, in real time, the vision image sent by the another terminal, and performs rendering in the GUI, to obtain the vision image. As shown in a vision image display area 801 and an enlarged view 801a of the vision image display area 801 shown in FIG. 3, a vision image corresponding to the character operation object a11 is displayed in the vision image display area 801; and the vision image is an image that can be viewed by a user controlling the character object associated with the character operation object a11. For example, if the character object c11 associated with the character operation object a11 currently performs a release operation on a skill object towards another character object b11, a vision image in which the character object c11 associated with the character operation object a11 currently performs the release operation on the skill object towards the another character object b11 is displayed in the vision image display area 801 in the GUI 800, as shown in FIG. 3. It may be understood that, by means of the vision obtaining gesture (such as the long press gesture), the terminal can rapidly switch to a vision image of another corresponding terminal, so that the user of the terminal can rapidly obtain a vision image of a teammate.

In an implementation, the operation execution unit 64 is further configured to: generate a second instruction when the detection unit 63 detects that the vision obtaining gesture stops, and stop, based on the second instruction, invoking the virtual lens associated with the at least one character operation object.

Specifically, an example in which the vision obtaining gesture is the long press gesture is used. The operation execution unit 64 generates the second instruction when the detection unit 63 detects that the long press gesture, and stops, based on the second instruction, invoking the virtual lens associated with the at least one character operation object; and the network connection between the terminal and the another terminal is terminated.

A person skilled in the art should understand that functions of processing units in the terminal in this embodiment of the present technology may be understood by referring to related descriptions of the information processing method. The processing units in the information processing terminal in this embodiment of the present technology may be implemented by implementing an analog circuit having the function in this embodiment of the present technology or may be implemented by running software having the function in this embodiment of the present technology on an intelligent terminal.

Figure 12:
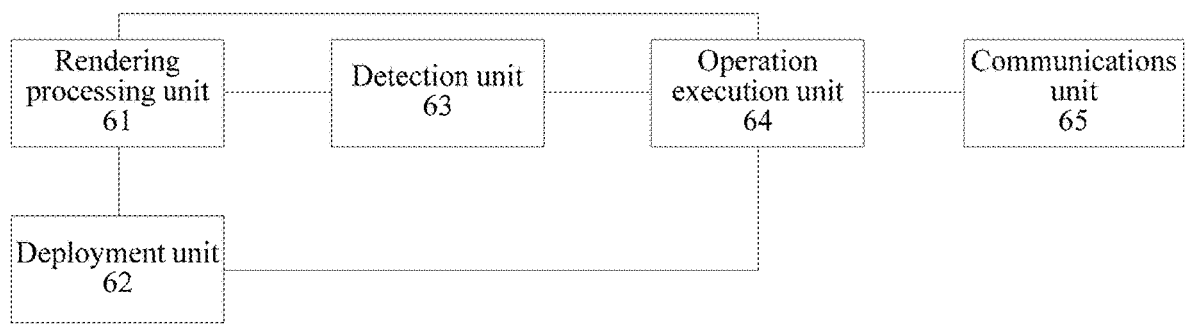
FIG. 12 is a schematic structural diagram of a terminal according to some embodiments of the present technology.

FIG. 12 is a schematic structural diagram of the terminal according to some embodiments of the present technology. As shown in FIG. 12, the terminal includes: a rendering processing unit 61, a deployment unit 62, a detection unit 63, an operation execution unit 64, and a communications unit 65.

The rendering processing unit 61 is configured to: execute a software application and perform rendering, to obtain a GUI; and perform rendering in the GUI, to obtain at least one virtual resource object; is further configured to: perform rendering in the GUI, to obtain a vision image captured by a virtual lens associated with at least one character operation object that is obtained by the operation execution unit 64; and is further configured to perform, in a first preset display manner, rendering on status attribute information obtained by the operation execution unit 64 in at least one window location corresponding to the associated character operation object.

The deployment unit 62 is configured to: deploy in such a manner that at least one character container object in at least one character selection area in the GUI includes at least one window location.

The detection unit 63 is configured to detect a vision obtaining gesture on the at least one character operation object in the character container object.

The operation execution unit 64 is configured to obtain, when the detection unit 63 detects the vision obtaining gesture on the at least one character operation object in the character container object, the vision image captured by the virtual lens associated with the at least one character operation object; is further configured to continuously record a change of a status attribute of a user character object in the GUI, generate status attribute information of the user character object, and synchronously update the status attribute information to a server by using the communications unit 65; and is further configured to obtain, from the server by using the communications unit 65, status attribute information of at least one character object associated with the at least one character operation object.

In this embodiment, for functions of the rendering processing unit 61, the deployment unit 62, the detection unit 63, and the operation execution unit 64, refer to descriptions of various embodiments, and details are not described herein again. A difference is that, in this embodiment, when the operation execution unit 64 continuously records the change of the status attribute of the user character object in the GUI, that is, in a process in which the user character object performs information exchange with another character object, the terminal records the change of the status attribute of the user character object in real time, to obtain the status attribute information of the user character object, where the status attribute information includes, but is not limited to: a blood value, a hit point or the skill attribute information of the user character object. The operation execution unit 64 synchronizes the obtained status attribute information of the user character object to the server by using the communications unit 65 in real time. Correspondingly, for the at least one second character object that belongs to the same group as the user character object, a terminal corresponding to the second character object also obtains status attribute information of the second character object in real time and synchronizes the status attribute information to the server.

Further, the operation execution unit 64 obtains, from the server by using the communications unit 65, the status attribute information of the at least one second character object that is synchronized by the another terminal, that is, obtains the status attribute information of the at least one character object associated with the at least one character operation object in the character container object in the GUI. It may be understood that, the operation execution unit 64 obtains the status attribute information of the second character object that belongs to the same group as the user character object, and performs, in the first preset display manner, rendering on the status attribute information of the second character object in the at least one window location corresponding to the associated character operation object. Referring to FIG. 6, an example in which the status attribute information is a blood value is used. An area at an outer circle of a character operation object in the character container object is used as a blood groove display area, and a current blood value of a corresponding second character object is represented by using a proportion of a blood value in the blood groove display area to the blood groove display area. Certainly, in this embodiment of the present technology, a manner of performing rendering on the status attribute information in a window location corresponding to the character operation object associated with the second character object is not limited to what is shown in FIG. 6.

In an implementation, the operation execution unit 64 is further configured to: continuously record a change of a skill attribute of a user character object in the GUI, generate skill attribute information of the user character object when determining that the skill attribute of the user character object meets a preset condition, and synchronously update the skill attribute information to a server by using the communications unit 65; and is further configured to obtain, from the server by using the communications unit 65, skill attribute information of at least one character object associated with the at least one character operation object.

Correspondingly, the rendering processing unit 61 is further configured to perform, in a second preset display manner, rendering on the skill attribute information obtained by the operation execution unit 64 in at least one window location corresponding to the associated character operation object.

Specifically, when the operation execution unit 64 continuously records the change of the skill attribute of the user character object in the GUI, that is, in a process in which the user character object performs information exchange with another character object, the operation execution unit 64 records the change of the skill attribute of the user character object in real time. After the user character object releases a skill object, the skill object can be restored after a period of time, that is, the skill object can be released again after the period of time. Therefore, in this embodiment, the operation execution unit 64 records the change of the skill attribute of the user character object in real time, determines, when determining that at least one skill object can be released, that the skill attribute of the user character object meets the preset condition, and generates the skill attribute information of the user character object, where the skill attribute information represents that the user character object can release the at least one skill object. The operation execution unit 64 synchronizes the obtained skill attribute information of the user character object to the server by using the communications unit 65 in real time. Correspondingly, for the at least one second character object that belongs to the same group as the user character object, the terminal corresponding to the second character object also obtains the skill attribute information of the second character object in real time and synchronizes the skill attribute information to the server.

The operation execution unit 64 obtains, from the server by using the communications unit 65, the skill attribute information of the at least one second character object that is synchronized by the another terminal, that is, obtains the skill attribute information of the at least one character object associated with the at least one character operation object in the character container object in the GUI. It may be understood that, the operation execution unit 64 obtains the skill attribute information of the second character object that belongs to the same group as the user character object, and performs, in the first preset display manner, rendering on the skill attribute information of the second character object in the at least one window location corresponding to the associated character operation object, where the skill attribute information displayed in the character operation object represents that a corresponding second character object currently can release at least one skill object. Referring to FIG. 8, at the upper right corner of a character operation object in the character selection area 802, the skill attribute information is represented by using a circular identifier. When the character operation object displays the circular identifier, it indicates that a second character object associated with the character operation object currently can release at least one skill object. When the character operation object does not display the circular identifier, it indicates that the second character object associated with the character operation object currently cannot release any skill object. Certainly, in this embodiment of the present technology, a manner of performing rendering on the status attribute information in a window location corresponding to the character operation object associated with the second character object is not limited to what is shown in FIG. 8.

A person skilled in the art should understand that functions of processing units in the terminal in this embodiment of the present technology may be understood by referring to related descriptions of the information processing method. The processing units in the information processing terminal in this embodiment of the present technology may be implemented by implementing an analog circuit having the function in this embodiment of the present technology or may be implemented by running software having the function in this embodiment of the present technology on an intelligent terminal.

In some embodiments of the present technology, in an actual application, the rendering processing unit 61, the deployment unit 62, the detection unit 63, and the operation execution unit 64 in the terminal may all be implemented by a central processing unit (CPU), a digital signal processor (DSP) or a field programmable gate array (FPGA) in the terminal; and in an actual application, the communications unit 65 in the terminal may be implemented by a transceiver antenna or a communications interface in the terminal.

This embodiment of the present technology further provides a terminal. The terminal may be an electronic device such as a PC or may be a portable electronic device such as a tablet computer, a laptop computer, or a smartphone. A game system is executed in the terminal by installing a software application (such as a game application), and the terminal includes at least a memory for storing data and a processor for data processing. For the processor for data processing, during processing, a microprocessor, a CPU, a DSP, or an FPGA may be used for implementation. The memory includes an operation instruction, the operation instruction may be computer executable code, and operations in the procedure of the information processing method in the embodiments of the present technology are implemented by using the operation instruction.

Figure 13:
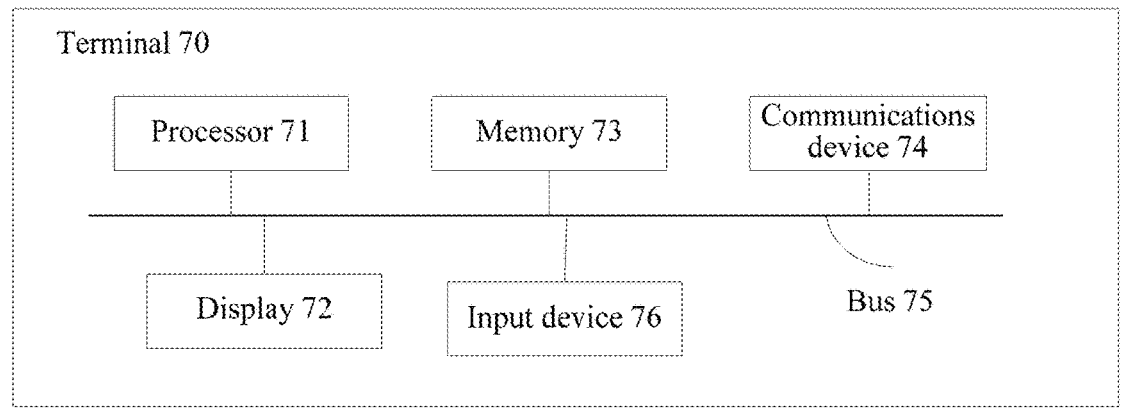
FIG. 13 is a schematic structural diagram of a terminal according to some embodiments of the present technology.

FIG. 13 is a schematic structural diagram of a terminal according to some embodiments of the present technology. As shown in FIG. 13, the terminal includes: a processor 71 and a display 72. The processor 71 is configured to: execute a software application and perform rendering on the display 72, to obtain a GUI. The processor, the GUI, and the software application are implemented on a game system.

The processor 71 is configured to: perform rendering in the GUI, to obtain at least one virtual resource object; and deploy in such a manner that at least one character container object in at least one character selection area in the GUI includes at least one window location; and perform, when detecting a vision obtaining gesture on at least one character operation object in the character container object, rendering in the GUI, to obtain a vision image captured by a virtual lens associated with the at least one character operation object.

Specifically, the processor 71 is configured to: generate and send a first instruction when detecting the vision obtaining gesture on the at least one character operation object in the character container object, where the first instruction is configured to invoke the virtual lens associated with the at least one character operation object and control the virtual lens to capture the vision image; and obtain, in a process of detecting the vision obtaining gesture, the vision image captured by the virtual lens.

In an implementation, the processor 71 is further configured to: generate a second instruction when the vision obtaining gesture stops, and stop, based on the second instruction, invoking the virtual lens associated with the at least one character operation object.

In an implementation, the server further includes a communications device 74, and the processor 71 is further configured to: continuously record a change of a status attribute of a user character object in the GUI, generate status attribute information of the user character object, and synchronously update the status attribute information to a server by using the communications device 74.

Correspondingly, the processor 71 is further configured to: obtain, from the server by using the communications device 74, status attribute information of at least one character object associated with the at least one character operation object, and perform, in a first preset display manner, rendering on the status attribute information in at least one window location corresponding to the associated character operation object.

In an implementation, the processor 71 is further configured to: continuously record a change of a skill attribute of a user character object in the GUI, generate skill attribute information of the user character object when determining that the skill attribute of the user character object meets a preset condition, and synchronously update the skill attribute information to a server by using the communications device 74.

Correspondingly, the processor 71 is further configured to: obtain, from the server by using the communications device 74, skill attribute information of at least one character object associated with the at least one character operation object, and perform, in a second preset display manner, rendering on the skill attribute information in at least one window location corresponding to the associated character operation object.

In this embodiment, the terminal includes: the processor 71, the display 72, a memory 73, an input device 76, a bus 75, and the communications device 74. The processor 71, the memory 73, the input device 76, the display 72, and the communications device 74 are all connected by using the bus 75, and the bus 75 is configured to transmit data between the processor 71, the memory 73, the display 72, and the communications device 74.

The input device 76 is mainly configured to obtain an input operation of a user, and the input device 76 may vary with the terminal. For example, when the terminal is a PC, the input device 76 may be an input device 76 such as a mouse or a keyboard; when the terminal is portable device such as a smartphone or a tablet computer, the input device 76 may be a touchscreen.

In this embodiment, a computer storage medium is stored in the memory 73, a computer executable instruction is stored in the computer storage medium, and the computer executable instruction is configured to perform the information processing method in the embodiments of the present technology.

In the several embodiments provided in this application, it should be understood that the disclosed device and method may be implemented in other manners. The described device embodiments are merely examples. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections between constituent parts may be implemented through some interfaces. The indirect couplings or communication connections between the devices or units may be implemented in electronic, mechanic, or other forms.

The units described as separate parts may or may not be physically separate, and parts displayed as units may or may not be physical units, may be located in one location, or may be distributed on multiple network units. Some or all of the units may be selected according to actual needs to achieve the objectives of the solutions of the embodiments.

In addition, the functional units in the embodiments of the present technology may all be integrated into one processing unit, or each of the units may exist separately, or two or more units are integrated into one unit, and the integrated unit may be implemented in a form of hardware, or may be implemented in a form of hardware in addition to a software functional unit.

A person of ordinary skill in the art may understand that all or some of the operations of the method embodiments may be implemented by a program instructing relevant hardware. The program may be stored in a computer-readable storage medium. When the program runs, the operations of the method embodiments are performed. The foregoing storage medium includes: any medium that can store program code, such as a portable storage device, a read-only memory (ROM), a random access memory (RAM), a magnetic disk, or an optical disc.

Alternatively, in the present disclosure, when the integrated unit is implemented in a form of a software functional module and sold or used as an independent product, the integrated unit may be stored in a computer-readable storage medium. Based on such an understanding, the technical solutions of the embodiments of the present technology essentially, or the part contributing to the existing technology may be implemented in a form of a software product. The computer software product is stored in a storage medium, and includes several instructions for instructing a computer device (which may be a personal computer, a server, or a network device) to perform all or some of the operations of the methods described in the embodiments of the present technology. The foregoing storage medium includes: any medium that can store program code, such as a portable storage device, a ROM, a RAM, a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

Industrial Applicability

In the embodiments of the present technology, by means of a window location in a character container object deployed in a character selection area in a GUI, rendering is performed, in a corresponding window location, on a character operation object associated with a second character object that belongs to a same group as a user character object, so that a user can rapidly obtain a vision image of the corresponding second character object by means of a vision obtaining gesture on the character operation object, thereby greatly improving operation experience of the user in an interaction process.

What is claimed is:

1. An information processing method, comprising:
   at a first gaming terminal of a plurality of gaming terminals engaged in a group game, wherein the first gaming terminal corresponds to a first game player, and a second gaming terminal of the plurality of gaming terminals corresponds to a second game player distinct from the first game player, and wherein the first gaming terminal comprises one or more processors and memory:

displaying a first game scene from a first viewing perspective corresponding to the first game player in the group game;

displaying, concurrently with the first game scene, a game avatar corresponding to the second game player;

while displaying the first game scene from the first viewing perspective corresponding to the first game player, detecting a user input directed to the game avatar corresponding to the second game player, wherein the user input meets predefined team-view criteria; and in response to detecting the user input that is directed to the game avatar corresponding to the second game player, and in accordance with a determination that the user input meets the predefined team-view criteria:

retrieving a second game scene from a second viewing perspective corresponding to the second game player, wherein the second game scene is distinct from the first game scene and the second game is currently displayed at the second game terminal; and displaying at least a portion of the second game scene at the first gaming terminal;

receiving an indication that the second gaming terminal has requested to display the first game scene at the second gaming terminal; and in response to receiving the indication that the second gaming terminal has requested to display the first game scene at the second gaming terminal, displaying an indicator in association with the game avatar corresponding to the second game player while the first game scene remains displayed at the second gaming terminal.

2. The method of claim 1, wherein displaying at least the portion of the second game scene includes continuing to update the second game screen displayed at the first gaming terminal in accordance with updates made to the second game scene currently displayed at the second gaming terminal.

3. The method of claim 2, including:

while displaying the second game scene at the first gaming terminal, detecting termination of the user input:

in response to detecting the termination of the user input:

in accordance with a determination that the user input has met temporary-display criteria, ceasing to display at least the portion of the second game scene at the first gaming terminal upon termination of the input; and in accordance with a determination that the user input has met sustained-display criteria, maintaining display of the portion of the second game scene at the first gaming terminal while continuing to update the second game screen displayed at the first gaming terminal in accordance with updates made to the second game scene currently displayed at the second gaming terminal.

4. The method of claim 1, including:

monitoring a status of the second game player;

determining whether the status of the second game player meets predefined status-event event criteria; and in response to determining that the status of the second game player meets the predefined status-event criteria:

in accordance with a determination that the second game scene from the viewing perspective of the second game player is not currently displayed at the first gaming terminal, displaying the second game scene from the viewing perspective of the second game player at the first gaming terminal; and in accordance with a determination that the second game scene from the viewing perspective of the second game player is currently displayed at the first gaming terminal, maintaining display of the second game scene from the viewing perspective of the second game player at the first gaming terminal.

5. The method of claim 4, wherein the status-event criteria are met by the status of the second game player when the second game player is ready to release a predefined game move.

6. The method of claim 1, including:

while displaying the second game scene at the first gaming terminal, detecting a second user input that meets scene-capture criteria;

in response to detecting the second user input that meets the scene-capture criteria:

capture the first game scene and the second game scene that are currently displayed at the first gaming terminal; and storing the first game scene and the second game scene in a library that is accessible through a post-game analysis interface of the group game.

7. An electronic device, comprising:

one or more processors; and memory, wherein:

the electronic device serves as a first gaming terminal of a plurality of gaming terminals engaged in a group game, wherein the first gaming terminal corresponds to a first game player, and a second gaming terminal of the plurality of gaming terminals corresponds to a second game player distinct from the first game player, and wherein the memory stores instructions, the instructions, when executed by the one or more processors, cause the processors to perform operations comprising:

displaying a first game scene from a first viewing perspective corresponding to the first game player in the group game;

displaying, concurrently with the first game scene, a game avatar corresponding to the second game player;

while displaying the first game scene from the first viewing perspective corresponding to the first game player, detecting a user input directed to the game avatar corresponding to the second game player, wherein the user input meets predefined team-view criteria; and in response to detecting the user input that is directed to the game avatar corresponding to the second game player, and in accordance with a determination that the user input meets the predefined team-view criteria:

retrieving a second game scene from a second viewing perspective corresponding to the second game player, wherein the second game scene is distinct from the first game scene and the second game is currently displayed at the second game terminal; and displaying at least a portion of the second game scene at the first gaming terminal;

receiving an indication that the second gaming terminal has requested to display the first game scene at the second gaming terminal; and in response to receiving the indication that the second gaming terminal has requested to display the first game scene at the second gaming terminal, displaying an indicator in association with the avatar corresponding to the second game player while the first game scene remains displayed at the second gaming terminal.

8. The device of claim 7, wherein displaying at least the portion of the second game scene includes continuing to update the second game screen displayed at the first gaming terminal in accordance with updates made to the second game scene currently displayed at the second gaming terminal.

9. The device of claim 8, wherein the operations comprise:
while displaying the second game scene at the first gaming terminal, detecting termination of the user input:
in response to detecting the termination of the user input:
in accordance with a determination that the user input has met temporary-display criteria, ceasing to display at least the portion of the second game scene at the first gaming terminal upon termination of the input; and
in accordance with a determination that the user input has met sustained-display criteria, maintaining display of the portion of the second game scene at the first gaming terminal while continuing to update the second game screen displayed at the first gaming terminal in accordance with updates made to the second game scene currently displayed at the second gaming terminal.

10. The device of claim 7, wherein the operations comprise:
monitoring a status of the second game player;
determining whether the status of the second game player meets predefined status-event criteria; and
in response to determining that the status of the second game player meets the predefined status-event criteria:
in accordance with a determination that the second game scene from the viewing perspective of the second game player is not currently displayed at the first gaming terminal, displaying the second game scene from the viewing perspective of the second game player at the first gaming terminal; and
in accordance with a determination that the second game scene from the viewing perspective of the second game player is currently displayed at the first gaming terminal, maintaining display of the second game scene from the viewing perspective of the second game player at the first gaming terminal.

11. The device of claim 10, wherein the status-event criteria are met by the status of the second game player when the second game player is ready to release a predefined game move.

12. The device of claim 7, wherein the operations include:
while displaying the second game scene at the first gaming terminal, detecting a second user input that meets scene-capture criteria;
in response to detecting the second user input that meets the scene-capture criteria:
capture the first game scene and the second game scene that are currently displayed at the first gaming terminal; and
storing the first game scene and the second game scene in a library that is accessible through a post-game analysis interface of the group game.

13. A non-transitory computer-readable storage medium storing instructions, the instructions, when executed by one or more processors, cause the processors to perform operations comprising:
at a first gaming terminal of a plurality of gaming terminals engaged in a group game, wherein the first gaming terminal corresponds to a first game player, and a second gaming terminal of the plurality of gaming terminals corresponds to a second game player distinct from the first game player:
displaying a first game scene from a first viewing perspective corresponding to the first game player in the group game;
displaying, concurrently with the first game scene, a game avatar corresponding to the second game player;
while displaying the first game scene from the first viewing perspective corresponding to the first game player, detecting a user input directed to the game avatar corresponding to the second game player, wherein the user input meets predefined team-view criteria; and
in response to detecting the user input that is directed to the game avatar corresponding to the second game player, and in accordance with a determination that the user input meets the predefined team-view criteria:
retrieving a second game scene from a second viewing perspective corresponding to the second game player, wherein the second game scene is distinct from the first game scene and the second game is currently displayed at the second game terminal; and
displaying at least a portion of the second game scene at the first gaming terminal;
receiving an indication that the second gaming terminal has requested to display the first game scene at the second gaming terminal; and
in response to receiving the indication that the second gaming terminal has requested to display the first game scene at the second gaming terminal, displaying an indicator in association with the avatar corresponding to the second game player while the first game scene remains displayed at the second gaming terminal.

14. The computer-readable storage medium of claim 13, wherein displaying at least the portion of the second game scene includes continuing to update the second game screen displayed at the first gaming terminal in accordance with updates made to the second game scene currently displayed at the second gaming terminal.

15. The computer-readable storage medium of claim 14, wherein the operations comprise:
while displaying the second game scene at the first gaming terminal, detecting termination of the user input:
in response to detecting the termination of the user input:
in accordance with a determination that the user input has met temporary-display criteria, ceasing to display at least the portion of the second game scene at the first gaming terminal upon termination of the input; and
in accordance with a determination that the user input has met sustained-display criteria, maintaining display of the portion of the second game scene at the first gaming terminal while continuing to update the second game screen displayed at the first gaming terminal in accordance with updates made to the second game scene currently displayed at the second gaming terminal.

16. The computer-readable storage medium of claim 13, wherein the operations comprise:
- monitoring a status of the second game player;
- determining whether the status of the second game player meets predefined status-event criteria; and
- in response to determining that the status of the second game player meets the predefined status-event criteria:
- in accordance with a determination that the second game scene from the viewing perspective of the second game player is not currently displayed at the first gaming terminal, displaying the second game scene from the viewing perspective of the second game player at the first gaming terminal; and
- in accordance with a determination that the second game scene from the viewing perspective of the second game player is currently displayed at the first gaming terminal, maintaining display of the second game scene from the viewing perspective of the second game player at the first gaming terminal.

17. The computer-readable storage medium of claim 16, wherein the status-event criteria are met by the status of the second game player when the second game player is ready to release a predefined game move.

18. The computer-readable storage medium of claim 13, wherein the operations include:
- while displaying the second game scene at the first gaming terminal, detecting a second user input that meets scene-capture criteria;
- in response to detecting the second user input that meets the scene-capture criteria:
- capture the first game scene and the second game scene that are currently displayed at the first gaming terminal; and
- storing the first game scene and the second game scene in a library that is accessible through a post-game analysis interface of the group game.

* * * * *